United States Patent
Usui et al.

(10) Patent No.: US 12,205,221 B2
(45) Date of Patent: Jan. 21, 2025

(54) COMPUTER SYSTEM AND METHOD FOR CONTROLLING GENERATION OF VIRTUAL MODEL WITH APPLIED JOINT STRUCTURE

(71) Applicant: BANDAI NAMCO ENTERTAINMENT INC., Tokyo (JP)

(72) Inventors: Kotaro Usui, Tokyo (JP); Kensuke Tsukanaka, Tokyo (JP); Tsuyoshi Koda, Tokyo (JP); Akihiko Yasunaga, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 175 days.

(21) Appl. No.: 17/957,578

(22) Filed: Sep. 30, 2022

(65) Prior Publication Data
US 2023/0028630 A1    Jan. 26, 2023

Related U.S. Application Data

(63) Continuation of application No. PCT/JP2021/013359, filed on Mar. 30, 2021.

(30) Foreign Application Priority Data

Mar. 30, 2020    (JP) .................. 2020-061659

(51) Int. Cl.
| | |
|---|---|
| G06T 13/00 | (2011.01) |
| A63F 13/55 | (2014.01) |
| G06T 17/00 | (2006.01) |
| G06T 19/20 | (2011.01) |
| G06V 10/74 | (2022.01) |

(52) U.S. Cl.
CPC .............. *G06T 17/00* (2013.01); *A63F 13/55* (2014.09); *G06T 19/20* (2013.01); *G06V 10/761* (2022.01);
(Continued)

(58) Field of Classification Search
None
See application file for complete search history.

(56) References Cited

U.S. PATENT DOCUMENTS

| | | | |
|---|---|---|---|
| 6,809,728 B2 | 10/2004 | Terauchi et al. | |
| 2003/0038801 A1* | 2/2003 | Terauchi | G06T 7/85 |
| | | | 348/E13.016 |

(Continued)

FOREIGN PATENT DOCUMENTS

| | | |
|---|---|---|
| JP | H11-339074 A | 12/1999 |
| JP | 2001-108421 A | 4/2001 |

(Continued)

OTHER PUBLICATIONS

May 11, 2021 International Search Report issued in Patent Application No. PCT/JP2021/013559.

(Continued)

*Primary Examiner* — Martin Mushambo
(74) *Attorney, Agent, or Firm* — Oliff PLC

(57) ABSTRACT

Model data of a virtual model imitating an object model is generated based on photographed data obtained by photographing the object model including a joint structure. A given applied joint structure is applied to the virtual model. The virtual model based on the model data is disposed in a given virtual space. Virtual model management data including the model data and data of the applied joint structure is stored in a predetermined storage section or is externally output as data for causing a joint of the virtual model to function.

18 Claims, 29 Drawing Sheets

(52) U.S. Cl.
    CPC ............... *G06T 2219/2012* (2013.01); *G06T 2219/2016* (2013.01)

(56) References Cited

U.S. PATENT DOCUMENTS

| | | | | |
|---|---|---|---|---|
| 2011/0311129 | A1* | 12/2011 | Milanfar | G06V 10/50 382/154 |
| 2015/0146923 | A1* | 5/2015 | Lee | G06T 7/579 382/103 |
| 2019/0095711 | A1* | 3/2019 | Northcutt | G06V 40/25 |
| 2019/0287288 | A1* | 9/2019 | Guay | G06T 13/40 |
| 2019/0362131 | A1* | 11/2019 | Gotoh | H04N 13/275 |

FOREIGN PATENT DOCUMENTS

| | | |
|---|---|---|
| JP | 2003-065736 A | 3/2003 |
| JP | 2008-033521 A | 2/2008 |

OTHER PUBLICATIONS

Gunpla Battle Becomes a Reality: Bandai uses 3D scanner to import Gunpla into the game [online], Jul. 21, 2018, https://www.itmedia.co.jp/news/articles/1807/21/news017.html.

Gunplagenjin SD, "[Gunpla Battle Laboratory] I visited the Gundam Base Tokyo. The world of GBF may be coming to reality. [Gumpla Battle Laboratory]", YouTube[online][video], Jul. 21, 2018, https://www.youtube.com/watch?v=aZtX7F dmktQ, [Search Date: Apr. 23, 2021].

Hikarina Channel EX, "A game with an all-new idea where the character's arms extend! [Let's Play Arms on Nintendo Switch] [Text-to-speech commentary]", YouTube[online][video], Jun. 3, 2017, https://www.youtube.com/watch?v=OA6q_XY3zQk.

Famitsu.com, "Gundam Breaker" Trial version "BETA Version" for PS3 is now available! The game contents were introduced based on the "BETA" version. [online], Mar. 11, 2013, [Search Date: Feb. 1, 2024] https://www.famitsu.com/news/201303/11030026.htm.

Free Encyclopedia, "Wikipedia", Gundam Breaker, [online],2013, [Search date: Feb. 1, 2024], https://ja.wikipedia.org/wiki/.

Pugera, [Gun-Bre3] Summary of Main Weapon Attack Motion List / What are the differences in motion? [Gundam Breaker 3 Strategy online], Mar. 7, 2016, [Search Date: Feb. 1, 2024], https://pgr.hatenablog.com/entry/2016/03/07/084719.

Naotin TV, [New Gun-Bre] The backpack I recommend most is this one! New Gundam Breaker [naotin] YouTube [online][video], Jun. 30, 2018, [Search Date: Feb. 1, 2024], https://www.youtube.com/watch?v=Rf9vIPxIRS8, Especially, Time 9:00~10:30.

* cited by examiner

COMPUTER SYSTEM AND METHOD FOR CONTROLLING GENERATION OF VIRTUAL MODEL WITH APPLIED JOINT STRUCTURE

CROSS REFERENCE TO RELATED APPLICATION

This application is a continuation of International Patent Application No. PCT/JP2021/013559, having an international filing date of Mar. 30, 2021, which designated the United States, the entirety of which is incorporated herein by reference. Japanese Patent Application No. 2020-061659 filed on Mar. 30, 2020 is also incorporated herein by reference in its entirety.

BACKGROUND

There have been known techniques for generating digital data of an object from photographed image data. For example, a known technique includes generating a 3D virtual model for computer graphics using a photographed image of an object, and generating texture used for the 3D virtual model from the photographed image (see Japanese Unexamined Patent Application Publication No. 2001-108421 and Japanese Unexamined Patent Application Publication No. 2003-065736, for example). Moreover, there have been known techniques for generating a landscape model using a photographed image of a scene including buildings (see Japanese Unexamined Patent Application Publication No. 11-339074, for example).

The 3D virtual model for the computer graphics is typically used for video games. Some video games are based on original works such as cartoons or aminations, and allow players to use characters (including a human, a robot, a weapon, a virtual creature, a vehicle, or the like) in the original works as player characters. In such games, players select favorite characters from various characters in the original works to play the game.

Meanwhile, in a toy business, assembly toys (e.g., assembly plastic models) based on the same original works as the games are sold, and fans of the original works assemble the assembly toys, look at the assembly toys, and play with the assembly toys. Some of these fans enjoy coloring the assembly toys by applying a unique color arrangement different from coloring in the original works.

However, coloring of the characters in the conventional video games is limited only to the coloring in the original works as it is, or to some variations provided. Thus, users can not play the game with the unique coloring of their own.

Such a demand exists not only in a field of the video game, but also in other fields such as a georama, city planning, a natural history material, or a house construction simulation.

DESCRIPTION OF EXEMPLARY EMBODIMENTS

Figure 1:
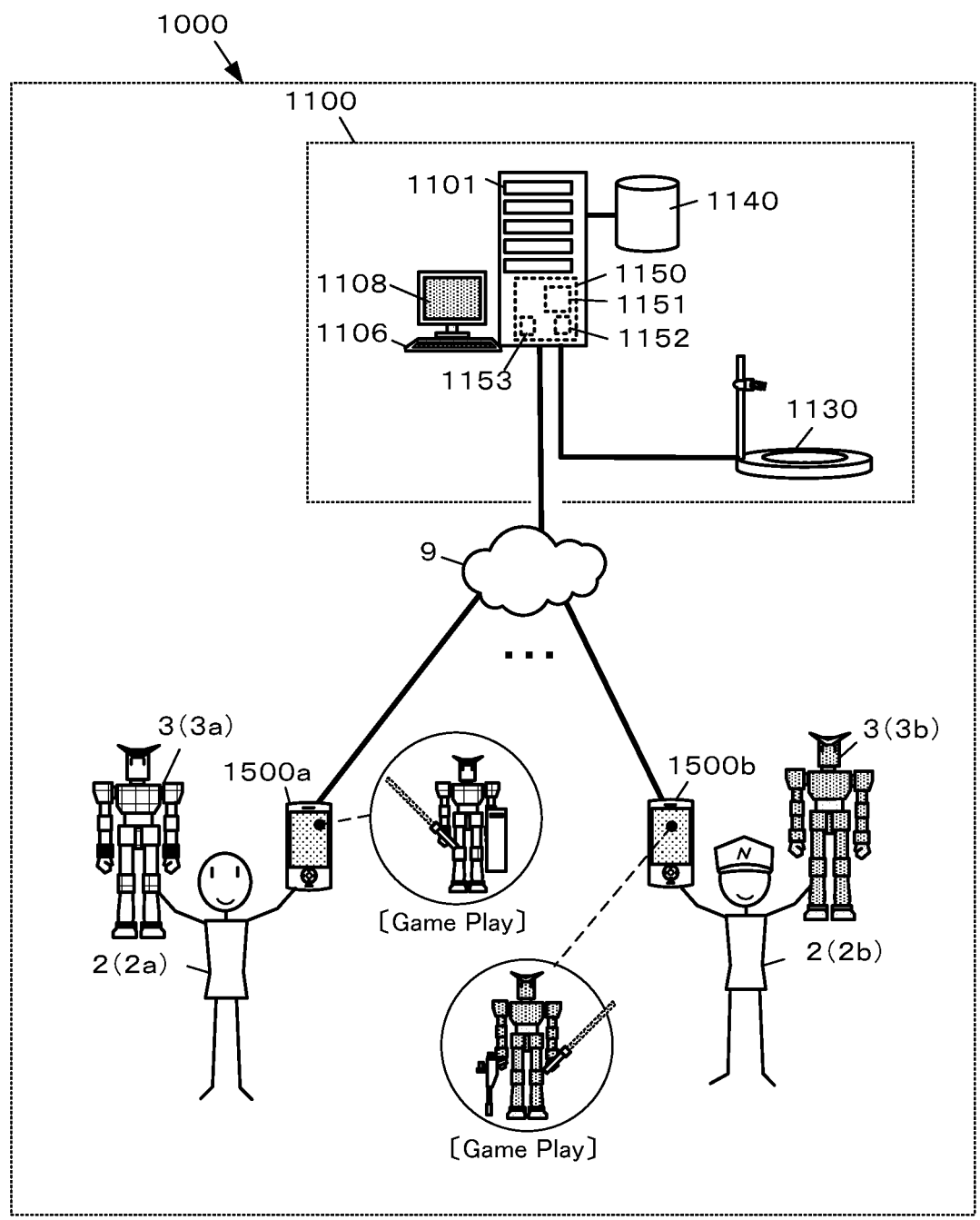
FIG. 1 is a diagram illustrating a configuration example of a game system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with one of some embodiments, there is provided a computer system comprising:

at least one processor or circuit programmed to perform:

generating model data of a virtual model imitating an object model based on photographed data obtained by photographing the object model including a joint structure;

applying a given applied joint structure to the virtual model; and storing in a predetermined storage section or externally outputting virtual model management data including the model data and data of the applied joint structure as data for disposing the virtual model based on the model data in a given virtual space and causing a joint of the virtual model to function in accordance with the applied joint structure.

The "computer system" used here may be implemented by a single computer, of course, or a plurality of computers in cooperation. Furthermore, a meaning of "imitating an object model" is not limited to that the virtual model has an appearance identical to a photographed appearance or a design in an original work, but includes deformation and a partial design change.

According to the disclosure, in some embodiments, it is possible to implement the computer system that photographs the object model that is an actual object, generates the virtual model from a photographed image, and stores or externally outputs the virtual model. Accordingly, the actual object uniquely colored by a user can be made to appear in computer graphics using the virtual model management data.

In accordance with a second disclosure, there is provided the computer system, wherein the photographed data is data obtained by photographing a whole circumference of the object model from multiple directions, and generating the model data includes generating the model data for forming the virtual model in three dimensions based on the photographed data.

According to the disclosure, in some embodiments, the whole circumference of the object prepared by the user can be photographed, so that the model data of the three-dimensional virtual model recognizable as the object when seen from any direction can be generated.

In accordance with a third disclosure, there is provided the computer system, wherein the at least one processor or circuit is further programmed to perform selecting a candidate model that matches the photographed object model from a plurality of candidate models, and applying includes selecting an applied joint structure candidate corresponding to the candidate model, and applying the selected applied joint structure candidate as the applied joint structure.

According to the disclosure, in some embodiments, it is possible to implement the computer system that selects the candidate model that matches the photographed object model from the plurality of candidate models prepared beforehand. In addition, the applied joint structure candidate prepared for each matching candidate model can be made the applied joint structure to be applied to the virtual model of the photographed object model. Accordingly, the computer system can quickly generate and set an appropriate virtual model when a type and an external feature of the object model are presumed beforehand.

In accordance with a fourth disclosure, there is provided the computer system, wherein selecting the candidate model includes selecting the candidate model that matches the photographed object model from the plurality of candidate models by performing an image recognition process based on the photographed data.

According to the disclosure, in some embodiments, it is possible to implement the computer system that selects the candidate model by the image recognition process to generate the virtual model. Accordingly, the virtual model can be generated quickly.

In accordance with a fifth disclosure, there is provided the computer system, wherein applying includes applying the applied joint structure based on a joint portion of the virtual model.

According to the disclosure, in some embodiments, it is possible to implement the computer system that can appropriately set the applied joint structure for a three-dimensional structure of the virtual model.

In accordance with a sixth disclosure, there is provided the computer system, wherein the at least one processor or circuit is further programmed to perform acquiring player information of a player relating to a given game, the virtual space is a game space of the game, and generating the model data includes generating the model data of the virtual model altered based on the player information.

The "player information" is information managed for each player. For example, the player information can include a user account, a player level given as an index indicating skill of the player in accordance with play performance, various types of data describing progress status of the game, or the like.

According to the disclosure, in some embodiments, it is possible to implement the computer system that disposes and controls the virtual model of the object prepared by the user in the game space. That is, a video game using the virtual model of the object can be provided. In addition, it is possible to implement the computer system that alters the virtual model based on the player information of the user. This can provide more fun in the game to the user in addition to that the object prepared by the user appears in the game.

In accordance with a seventh disclosure, there is provided the computer system, wherein generating the model data includes presenting options for alteration of the virtual model based on the player information to the player, and generating the model data of the virtual model altered based on a selection operation by the player.

According to the disclosure, in some embodiments, it is possible to implement the computer system that gives freedom of selection of alteration to the player.

In accordance with an eighth disclosure, there is provided the computer system, wherein generation the model data includes altering at least coloring of the virtual model.

In accordance with a ninth disclosure, there is provided the computer system, wherein generation the model data includes altering at least a parameter value serving as a basis of a motion control of the virtual model in the game space.

"A parameter value serving as a basis of a motion control" includes, for example, motion data of the virtual model, a value affecting motion content referred to and reproduced in execution of the motion data (e.g., reproduction speed of the motion, or a motion limit).

In accordance with a tenth disclosure, there is provided the computer system, wherein generation the model data includes altering at least a game parameter value relating to the game of the virtual model.

"A game parameter value relating to the game of the virtual model" is a parameter value applied to the virtual model and affecting a game progress. For example, the game parameter value corresponds to a parameter value defining an ability of a character of the virtual model, the value affecting the motion content referred to and reproduced in the execution of the motion data (e.g., the reproduction speed of the motion, or the motion limit), or the like.

In accordance with an eleventh disclosure, there is provided the computer system, wherein the at least one processor or circuit is further programmed to perform evaluating the object model based on the photographed data, setting a game parameter value relating to the game of the virtual model based on an evaluation result, the object model is an assembly toy imitating a character in a given work, and the virtual model management data includes the game parameter value.

According to the disclosure, in some embodiments, it is possible to implement the computer system that evaluates workmanship of the object model as the assembly toy, and sets the game parameter value applied to gameplay using the virtual model in accordance with an evaluation result.

In accordance with a twelfth disclosure, there is provided the computer system, wherein the at least one processor or circuit is further programmed to perform disposing the virtual model in the virtual space based on the virtual model management data, and causing the joint relating to the applied joint structure to function based on given motion data to control the virtual model.

According to the disclosure, in some embodiments, it is possible to implement the computer system that controls motions of the virtual model based on the virtual model management data.

In accordance with a thirteenth disclosure, there is provided the computer system, wherein controlling the virtual model includes controlling movability of the joint relating to the applied joint structure and deformation of the joint by a motion control of the virtual model based on the motion data.

According to the disclosure, in some embodiments, even when the object is not modeled as having the joint structure in the first place (e.g., a structure like a glove), for example, it is possible to implement the computer system that controls the movability of a part corresponding to the joint relating to the applied joint structure and the deformation of the joint to cause the virtual model to implement the motion indicated by the motion data. For example, as for the virtual model having the structure like the glove (a plastic glove or a hand-knitted glove), it is not determined where the joint should be. However, when a wearer (lengths of fingers, or distances between the joints are characteristic to each wearer) wears the glove and moves his/her hand, positions corresponding to the joints of the hand vary depending on the wearer, and cloth or the like forming the glove moves and deforms at the positions of the joints to follow the motion of the hand. According to the disclosure, in some embodiments, a feature similar to this can be implemented.

In accordance with a fourteenth disclosure, there is provided the computer system, wherein the at least one processor or circuit is further programmed to perform setting a motion limit of the joint relating to the applied joint structure, and controlling the virtual model includes performing a motion control of the joint based on the motion data within a range of the motion limit.

According to the disclosure, in some embodiments, it is possible to implement the computer system that performs the motion control of the virtual model within the range of the motion limit.

In accordance with a fifteenth disclosure, there is provided the computer system, wherein the at least one processor or circuit is further programmed to perform causing the virtual model to partly expand and contract.

According to the disclosure, in some embodiments, it is possible to implement the computer system that controls the virtual model to partly expand or contract when performing the motion control of the virtual model.

In accordance with a sixteenth disclosure, there is provided the computer system, wherein the at least one processor or circuit is further programmed to perform causing a separable part included in the virtual model to separate from the virtual model.

According to the disclosure, in some embodiments, it is possible to implement the computer system that can control the virtual model with part of the virtual model separated when performing the motion control of the virtual model.

In accordance with a seventeenth disclosure, there is provided the computer system, wherein the at least one processor or circuit is further programmed to perform causing a given different part exchangeable with the separable part to attach to the virtual model in place of the separable part separated from the virtual model.

According to the disclosure, in some embodiments, it is possible to implement the computer system that causes the different part to attach to the virtual model in place of the separable part.

According to an 18th aspect of the predetermined disclosure, a method, performed by the computer system, for controlling generation of the virtual model is provided. The method includes generating the model data of the virtual model imitating the object model based on the photographed data obtained by photographing the object model including the joint structure, applying the given applied joint structure to the virtual model, and storing in the predetermined storage section or externally outputting the virtual model management data including the model data and the data of the applied joint structure as the data for disposing the virtual model based on the model data in the given virtual space and causing the joint of the virtual model to function in accordance with the applied joint structure.

According to the disclosure, in some embodiments, the method for controlling the generation of the virtual model that can exert advantageous effects described above can be implemented.

Exemplary embodiments are described below. Note that the following exemplary embodiments do not in any way limit the scope of the content defined by the claims laid out herein. Note also that all of the elements described in the present embodiment should not necessarily be taken as essential elements Hereinafter, examples of embodiments of the present disclosure are described. Note that modes to which the present disclosure is applicable are not limited to the following embodiments.

First Embodiment

FIG. 1 is a diagram illustrating a configuration example of a game system.

A game system 1000 includes a server system 1100 and a player terminal 1500 (1500a, 1500b, . . . ) that are connected via a network 9 to perform mutual data communication. Although FIG. 1 illustrates only two player terminals 1500 (1500a, 1500b, . . . ), more player terminals 1500 can access the server system 1100 in actual system operation.

The game system 1000 is a computer system that provides an online game to a player 2 (2a, 2b, . . . ) who is a user using the player terminal 1500. The game system 1000 may provide any other services, of course.

The network 9 means a communication channel capable of data communication. That is, the network 9 inclusively means a communication network such as a local area network (LAN) using a private line (a private cable) for direct connection or Ethernet (registered trademark), a telecommunication network, a cable network, and an Internet. A communication method may be a cable communication method or a wireless communication method.

The server system 1100 includes a main body device 1101, a keyboard 1106, a touch panel 1108, a whole circumference photographing device 1130, and a storage 1140, for example, and is a computer system including a control board 1150 in the main body device 1101. The server system 1100 is installed at a place where players 2 can gather, such as a store including a toy store, an amusement arcade, or an event site.

Figure 2:
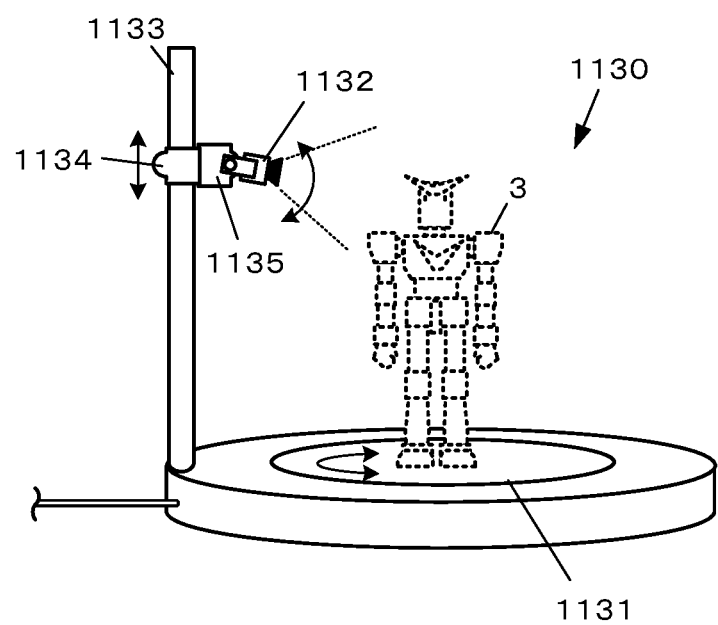
FIG. 2 is a diagram illustrating a configuration example of a whole circumference photographing device.

FIG. 2 is a diagram illustrating a configuration example of the whole circumference photographing device 1130.

The whole circumference photographing device 1130 is a device that performs whole circumference photographing of an object model that is an assembly toy 3 (3a, 3b, . . . ) that the player 2 (2a, 2b, . . . ) has assembled and colored (surface coloring or surface decoration by painting, or attaching decals). The whole circumference photographing device 1130 includes a turntable 1131, a camera 1132, and a camera supporting device 1133, and operation thereof is controlled by the control board 1150.

The turntable 1131 is a movable base used for fixing an object pivotally supported by a rotation axis in a vertical direction, and rotation thereof is controlled by the control board 1150.

The camera 1132 is a device that performs color digital photographing. Photographed data (image data) is stored in the server system 1100.

The camera supporting device 1133 is a device used for supporting the camera 1132 and changing a position and posture of photographing, and operation thereof is controlled by the control board 1150. The camera supporting device 1133 is implemented by mounting a remote-controlled camera platform 1135 on a lift 1134, for example.

The configuration of the whole circumference photographing device 1130 is not limited to this, and may be set as appropriate. For example, when a plurality of fixed cameras are configured to photograph a whole circumference of the object, the turntable 1131 and the camera supporting device 1133 can be omitted.

Referring back to FIG. 1, the control board 1150 includes a microprocessor of various types such as a central processing unit (CPU) 1151, a graphics processing unit (GPU), or a digital signal processor (DSP), an IC memory 1152 of various types such as a VRAM, a RAM, or a ROM, and a communication device 1153. The control board 1150 may be implemented partially or entirely by an application specific integrated circuit (ASIC), a field-programmable gate array (FPGA), or a system on a chip (SoC).

Through a calculation process performed by the control board 1150 based on a predetermined program and data, the server system 1100 implements (1) a user management function of managing information related to user registration or the like, (2) a virtual model generation function of generating a three-dimensional (3D) virtual model for computer graphics based on photographed data obtained by photographing the assembly toy 3 brought by the player 2, and (3) a game management function of performing a game progress control. That is, the server system 1100 functions as a virtual model generation control device, and as a game server that provides a kind of client-server online game using the generated virtual model.

The server system 1100 is illustrated as including only one server device. However, the server system 1100 may be implemented by a plurality of devices. For example, the server system 1100 may be configured such that a plurality of blade servers are connected together via an internal bus in a data communicable manner to share the functions. Hardware included in the server system 1100 may be installed anywhere. The server system 1100 may be configured such that a plurality of independent server devices installed at separate places perform data communication via the network 9 to function as the server system 1100 as a whole.

Figure 3:
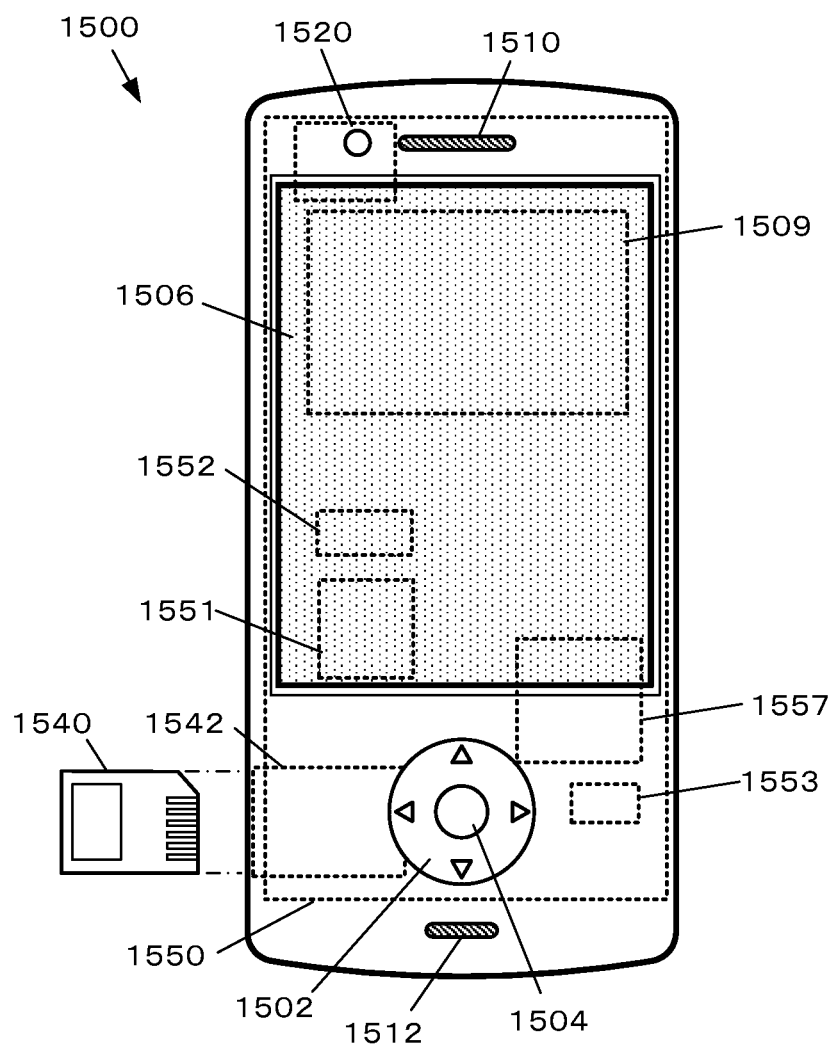
FIG. 3 is a front view of a configuration example of a player terminal.

FIG. 3 is a front view of a configuration example of the player terminal 1500. The player terminal 1500 is a computer system that is used by a registered user to use the game system 1000 according to the present embodiment, and is an electronic apparatus (an electronic device) that can access the server system 1100 via the network 9. The player terminal 1500 is a device used by the user to play the game.

The player terminal 1500 in FIG. 3 is a device known as a smartphone. The user terminal 1500 may also be any other computer including a wearable computer such as a smartwatch or smartglasses, a portable game device, a tablet computer, or a personal computer. When a plurality of electronic devices, such as a combination of a smartphone and a smartwatch capable of establishing a communication connection with the smartphone, are communicably connected and perform a single function, the plurality of electronic devices may be considered as a single player terminal 1500.

The player terminal 1500 includes an arrow key 1502, a button switch 1504, a touch panel 1506 functioning as an image display device and a touch position input device, a built-in battery 1509, a speaker 1510, a microphone 1512, a camera 1520, a control board 1550, and a memory card reader 1542 capable of writing and reading data on and from a memory card 1540 that is a computer readable storage medium. The player terminal 1500 further includes a power button, a volume control button, or the like (not illustrated). Furthermore, the player terminal 1500 may include an IC card reader capable of implementing contactless writing and reading of data on and from an IC card, such as a credit card or a prepaid card, that can be used to pay a cost for using the game system 1000 or the like.

The control board 1550 includes (1) a microprocessor of various types such as a CPU 1551, a GPU, or a DSP, (2) an IC memory 1552 of various types such as a VRAM, a RAM, or a ROM, (3) a wireless communication module 1553 for performing wireless communication with a mobile phone base station, a wireless LAN base station, or the like connected to the network 9, and (4) an interface circuit 1557, for example.

The interface circuit 1557 includes (1) a driver circuit for the touch panel 1506, (2) a circuit that receives signals from the arrow key 1502 and the button switch 1504, (3) an output amplifier circuit that outputs sound signals to the speaker 1510, (4) an input signal generation circuit that generates signals corresponding to the sounds collected by the microphone 1512, (5) a circuit that inputs image data of an image photographed by the camera 1520, and (6) a signal input-output circuit for the memory card reader 1542, for example.

These elements mounted on the control board 1550 are electrically connected with each other via a bus circuit or the like to exchange data and signals. The control board 1550 may be partially or entirely implemented by an ASIC, an FPGA, or an SoC. The control board 1550 stores programs and various types of data for implementing a function of the player terminal in the IC memory 1552.

According to the present embodiment, the player terminal 1500 downloads programs and various types of setting data from the server system 1100. Alternatively, the player terminal 1500 may read the programs and the data from a storage medium such as the memory card 1540 additionally provided.

Next, a game is described.

The game according to the present embodiment has content having a motif of a world view of an original work, and the player plays the game using a character in the original work as a player character. The game according to the present embodiment is hereinafter described as a match game where the character selectable as the player character is a robot weapon.

First of all, as illustrated in FIG. 1, each player 2 (2a, 2b, . . . ) assembles and prepares an assembly toy 3 (3a, 3b, . . . ) of a character. The assembly toy 3 is an actual object and is a plastic model imitating a character in an original work (a given work) such as a novel.

Figure 4:
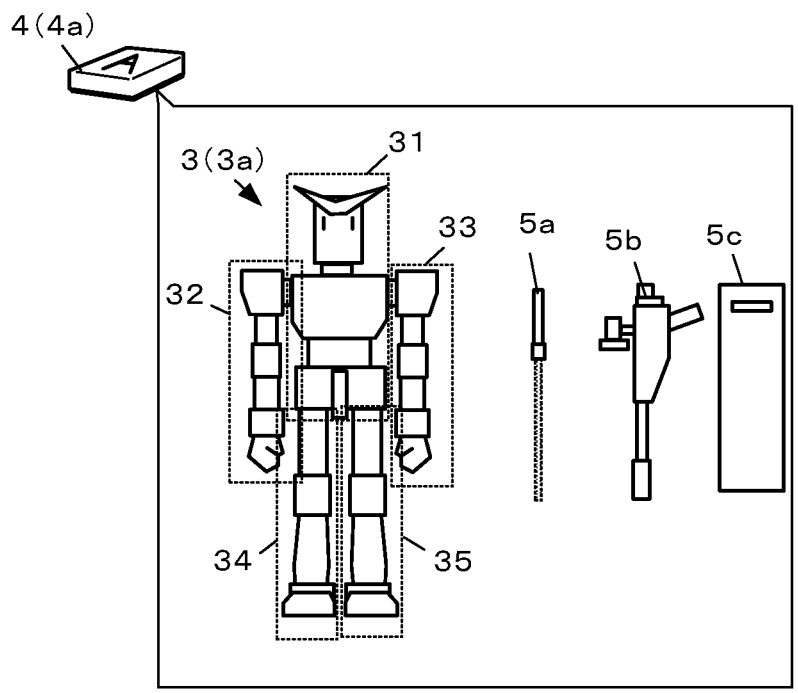
FIG. 4 is a diagram illustrating a package of an assembly toy.
Figure 4:
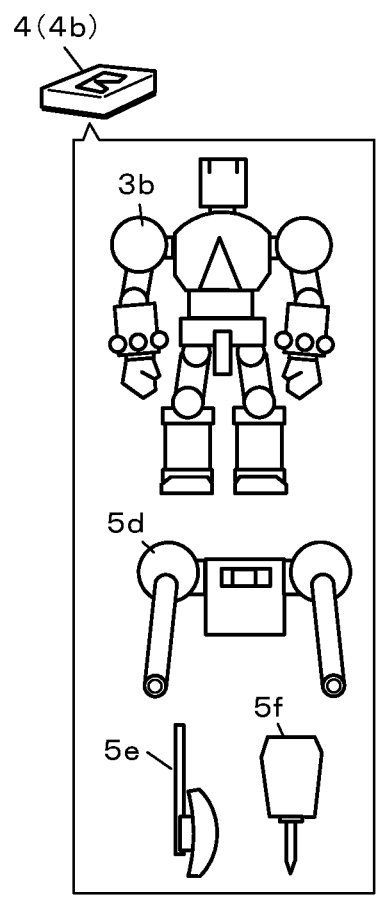
Figure 4:
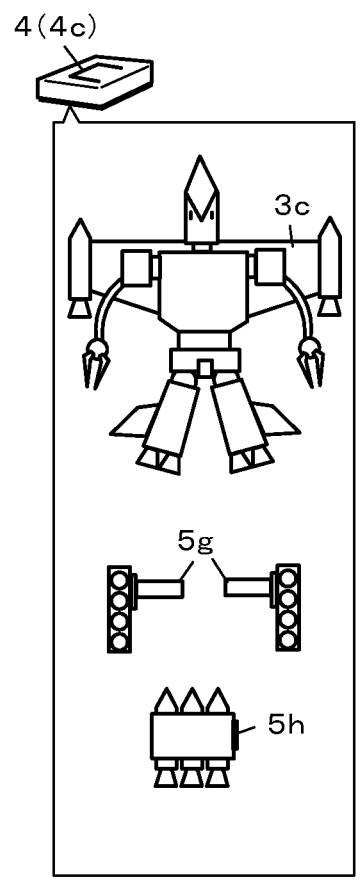

As illustrated in FIG. 4, a kit of the assembly toy 3 is sold as a package 4 for each character. Each package 4 (4a, 4b, . . . ) includes parts to be assembled into a main body of the assembly toy 3 (3a, 3b, . . . ) and parts assembled into an equipment 5 (5a, 5b, . . . ) such as a weapon or a protection designed to be attachable to and detachable from the main body of the assembly toy 3.

A shape and a part configuration of the main body of the assembly toy 3 are designed to reproduce the character in the original work as faithfully as possible. The assembly toy 3 according to the present embodiment generally has a human shape, and has the part configuration including a main body section 31 including a head and a torso, a right arm section 32, a left arm section 33, a right leg section 34, and a left leg section 35.

Figure 5A:
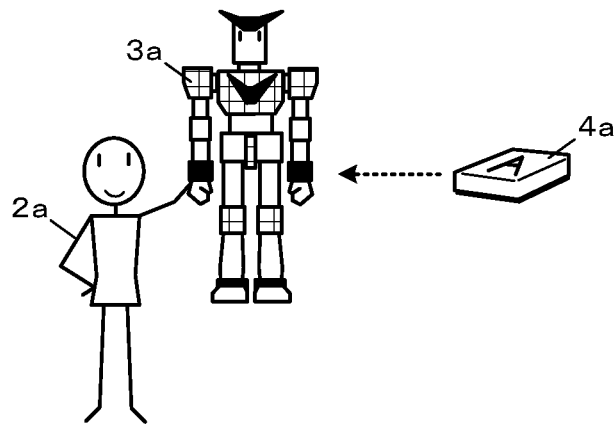
FIG. 5A is a diagram illustrating an example of the assembly toy of each player.
Figure 5B:
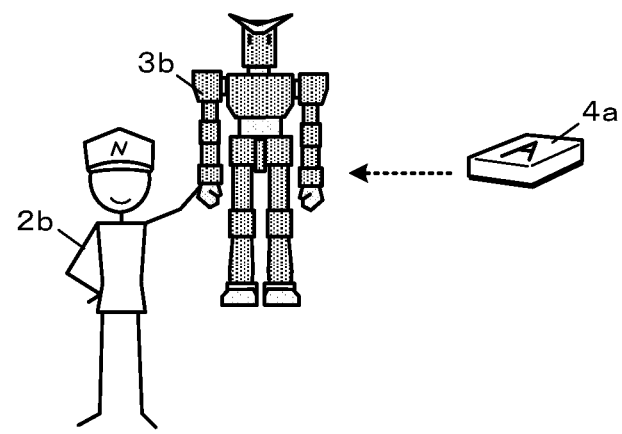
FIG. 5B is a diagram illustrating an example of the assembly toy of each player.
Figure 5C:
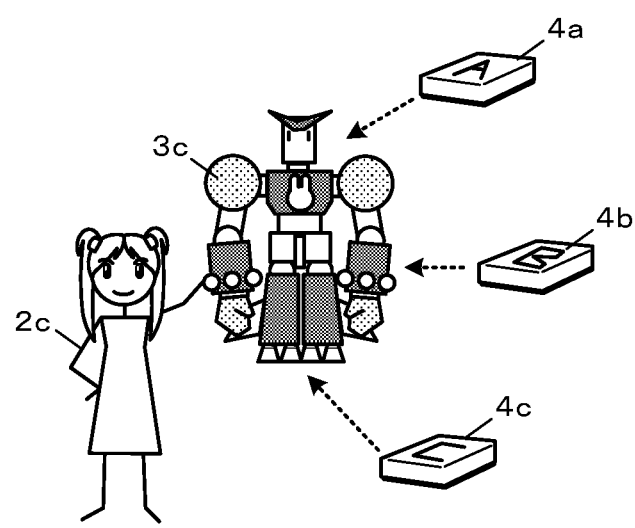
FIG. 5C is a diagram illustrating an example of the assembly toy of each player.

As illustrated in FIGS. 5A to 5C, the player 2 (2a, 2b, . . . ) previously purchases the package 4 of the character, and assembles and colors the plastic model. The assembly toy 3a of the player 2a in FIG. 5A and the assembly toy 3b of the player 2b in FIG. 5B are the same character, but coloring is different. One assembly toy 3 does not have to be assembled from parts in one package 4. As the player 2c in FIG. 5C, the player may purchase several packages 4 (4a, 4b, and 4c), and assemble one assembly toy 3c by freely combining the parts in those packages.

Then, the player 2 brings the assembly toy 3 that the player has assembled and colored to a store or the like having the server system 1100 before playing the game, and has the assembly toy 3 photographed with the whole circumference photographing device 1130 to prepare a 3D virtual model (a virtual model for the computer graphics) of the assembly toy 3.

Figure 6:
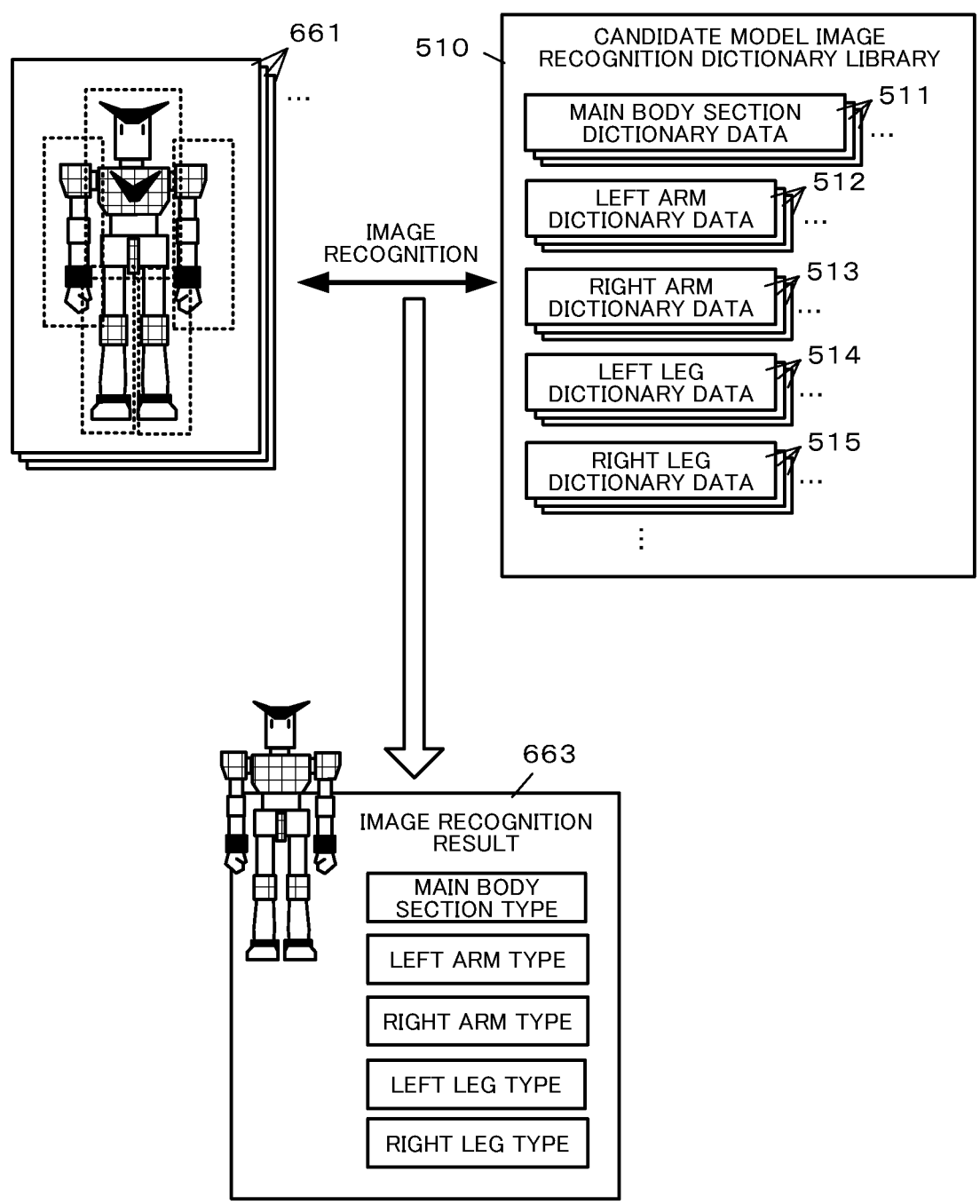
FIG. 6 is a diagram illustrating recognition of parts of the assembly toy based on photographed data.

As illustrated in FIG. 6, the server system 1100 controls the whole circumference photographing device 1130 to perform whole circumference photographing with the assembly toy 3 as an object model, and stores one or a plurality of pieces of photographed data 661 obtained by photographing in association with a user account.

Next, the server system 1100 presumes from the photographed data 661 which candidate model, prepared beforehand, each part (the main body section 31, the right arm section 32, the left arm section 33, the right leg section 34, and the left leg section 35 in the present embodiment) of the object model matches (or corresponds to).

In particular, the server system 1100 previously stores a candidate model image recognition dictionary library 510. This library includes main body section dictionary data 511, left arm dictionary data 512, right arm dictionary data 513, left leg dictionary data 514, and right leg dictionary data 515. The server system 1100 determines which type of the candidate model each part of the assembly toy 3 matches by image recognition based on the dictionary data in this library. Then, the server system 1100 stores a result of the image recognition as an image recognition result 663.

Figure 7:
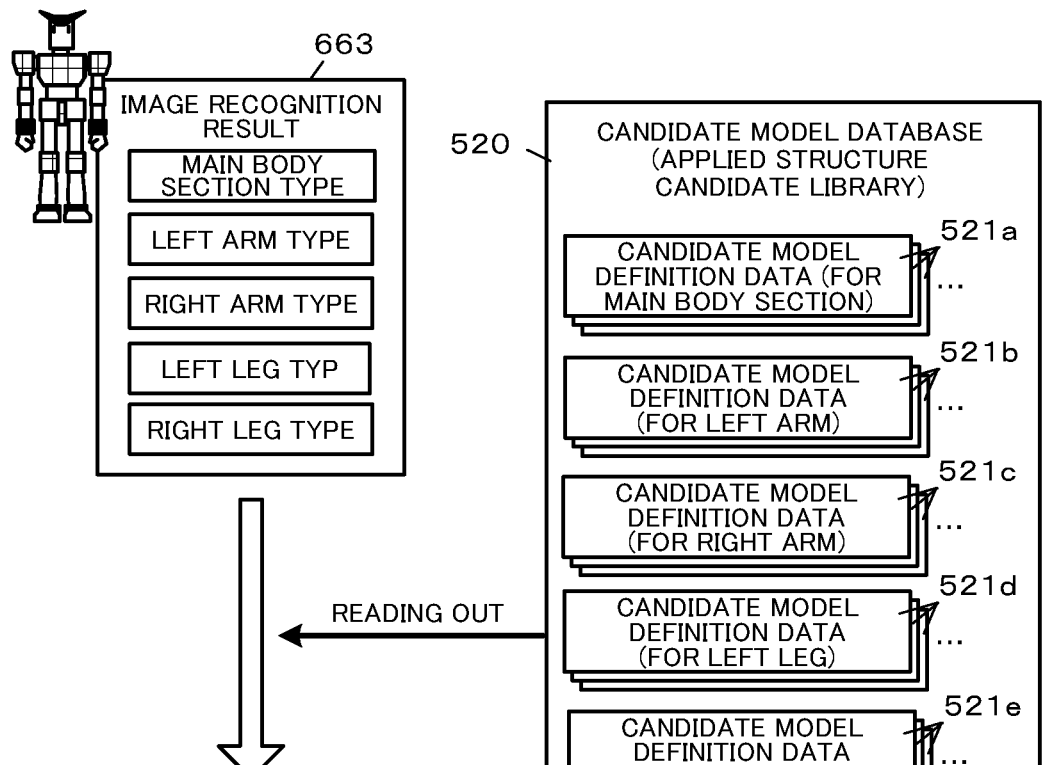
FIG. 7 is a diagram illustrating selection of candidate models based on a recognition result of the parts of the assembly toy, generation of model data of a virtual model, and selection of an applied joint structure.
Figure 7:
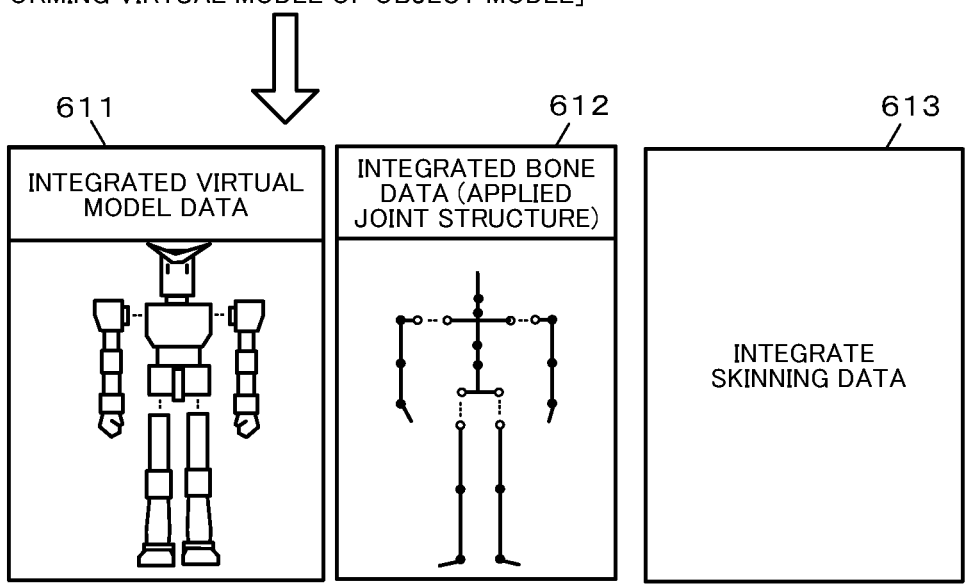

Next, as illustrated in FIG. 7, the server system 1100 selects a candidate model (a 3D virtual part model) of the each part of the object model indicated by the image recognition result 663 from a candidate model database 520. That is, the server system 1100 selects the candidate model that matches the photographed object model from a plurality of candidate models.

The candidate model database 520 stores information relating to the 3D virtual model modeled on each part of the character available as the player character in the game. In particular, the candidate model database 520 includes candidate model definition data 521 (521a, 521b, . . . ) for each of the main body section, the left arm, the right arm, the left leg, and the right leg. Classification of types of the candidate model definition data 521 may be set as appropriate depending on how the virtual model is divided into parts.

Figure 8:
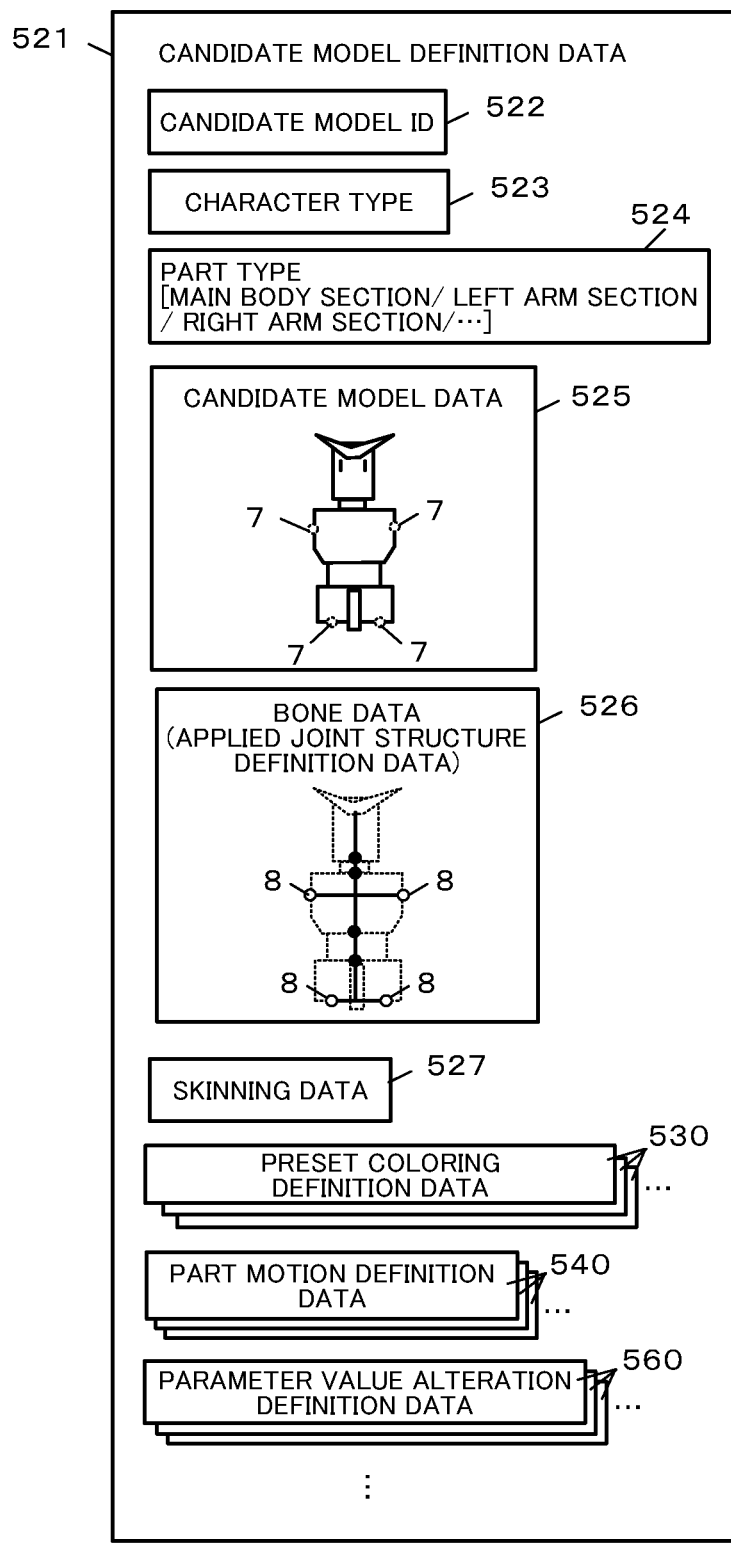
FIG. 8 is a diagram illustrating a data configuration example of candidate model definition data.

One piece of candidate model definition data 521 includes, as illustrated in FIG. 8, for example,
(1) a unique candidate model ID 522,
(2) a character type 523 indicating which character's part in the game a relevant candidate model is,
(3) a part type 524 of the candidate model,
(4) candidate model data 525,
(5) bone data 526 defining an applied joint structure prepared for the candidate model,
(6) skinning data 527 defining a surface relating to each bone defined by the bone data 526, and used for smoothly deforming the surface in accordance with a joint angle,
(7) preset coloring definition data 530 defining coloring applicable to the candidate model, (8) part motion definition data 540 defining a part motion serving as a basis of a motion control applied to the candidate model, and (9) parameter value alteration definition data 560 defining a setting of a parameter value relating to the candidate model.

Other types of data can be included as appropriate, of course.

The candidate model data 525 is a part model indicated by the part type 524 of the 3D virtual model of the character, and includes one or a plurality of objects. The candidate model data 525 is previously defined with a model connecting point 7 for connecting with another candidate model of another part. According to the present embodiment, the character selectable as the player character has a human shape, and has four model connecting points 7 defined for connecting the right arm section 32, the left arm section 33, the right leg section 34, and the left leg section 35 to the main body section 31.

The bone data 526 defines a connective relation (relative flexibility) related to a relative positional relationship of the objects included in the candidate model data 525 when a motion control of the candidate model is performed. The bone data 526 is defined with a bone connecting point 8 for connecting with another bone data of another part. The bone connecting point 8 corresponds to the model connecting point 7.

Referring back to FIG. 7, after selecting the candidate model (the 3D virtual model) of the each part of the object model indicated by the image recognition result 663, the server system 1100 connects the candidate model data 525 of the selected candidate models via the model connecting points 7 to generate integrated virtual model data 611. The integrated virtual model data 611 is 3D virtual model data of one whole body of the virtual model imitating a shape of the photographed object model.

Furthermore, after selecting the candidate model (the 3D virtual model) of the each part of the object model indicated by the image recognition result 663, the server system 1100 connects the bone data 526 of the selected candidate models via the bone connecting points 8 to generate integrated bone data 612. The integrated bone data 612 is bone data of one whole body of the virtual model imitating the shape of the photographed object model.

Furthermore, after selecting the candidate model (the 3D virtual model) of the each part of the object model indicated by the image recognition result 663, the server system 1100 integrates the skinning data 527 of the selected candidate models in conformity with the integrated virtual model data 611 and the integrated bone data 612 to generate integrated skinning data 613. The integrated skinning data 613 is skinning data of one whole body of the virtual model imitating the shape of the photographed object model.

Once the integrated virtual model data 611, the integrated bone data 612, and the integrated skinning data 613 are generated, structural information relating to the virtual model of the object model is all prepared.

Next, a color relating to the virtual model of the object model is described.

Figure 9:
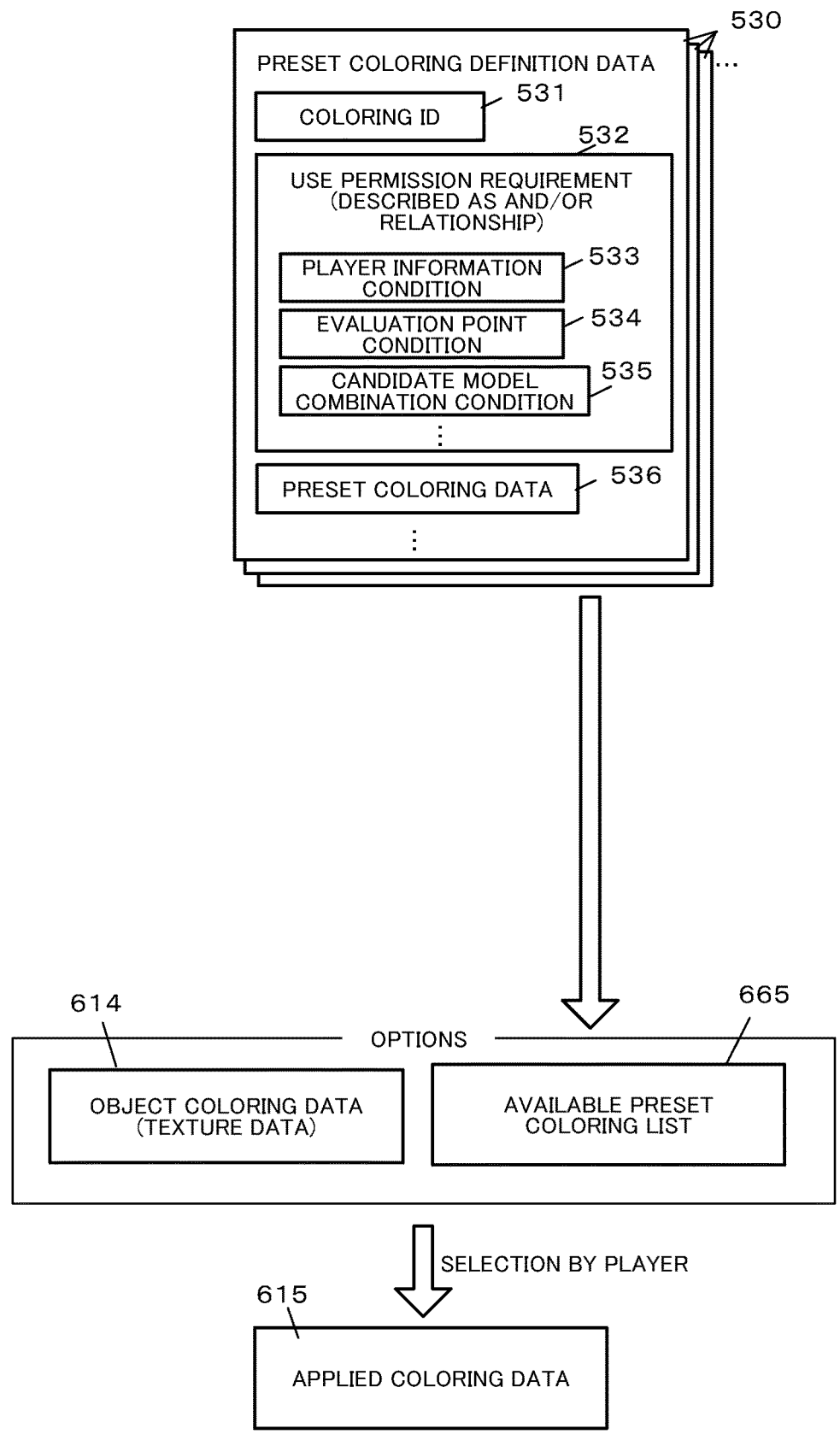
FIG. 9 is a diagram illustrating a data configuration example of preset coloring definition data, and alteration of coloring of the virtual model.

FIG. 9 is a diagram illustrating a data configuration example of the preset coloring definition data 530 in the candidate model definition data 521. The preset coloring definition data 530 is generated for each coloring of the character in the original work having the part of the relevant candidate model, or each coloring permitted by an administrator of the game system 1000.

One piece of preset coloring definition data 530 includes a unique coloring ID 531, a use permission requirement 532, and preset coloring data 536. Other types of data can be included as appropriate, of course.

The use permission requirement 532 defines a requirement for permitting the player to use the relevant preset coloring. The use permission requirement 532 is described as an AND or OR relationship of a player information condition 533, an evaluation point condition 534, and a candidate model combination condition 535.

The player information condition 533 defines a condition required to be satisfied in relation to information on the player 2. For example, the player information condition 533 may specify a threshold or a range of a player level. Alternatively, the condition may include an item related to information on an owned item, play performance, a number of times of play, or the like.

Figure 10:
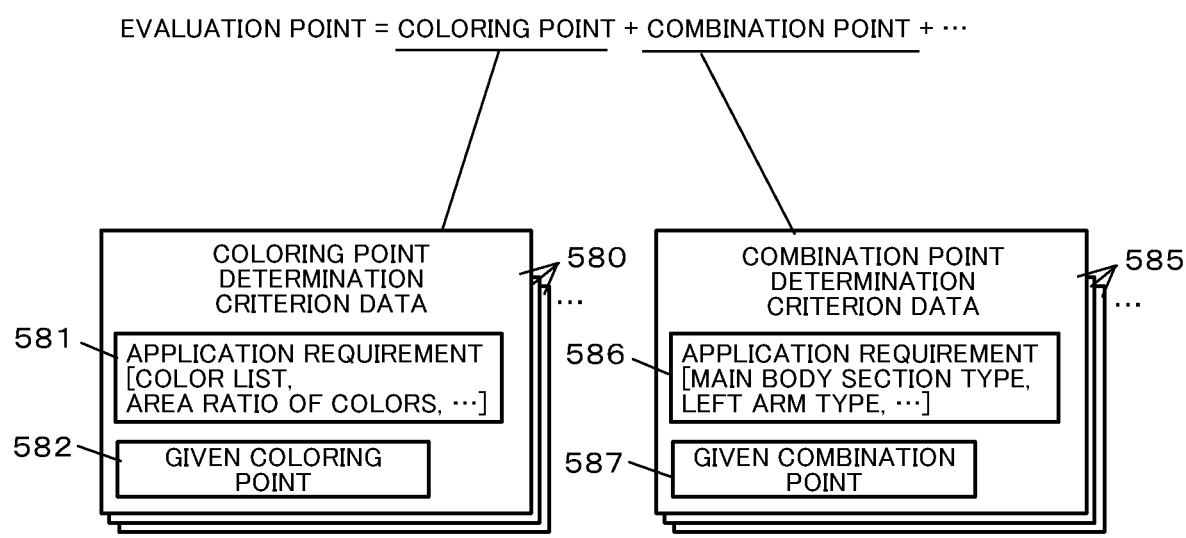
FIG. 10 is a diagram illustrating an evaluation point.

The evaluation point condition 534 defines a condition required to be satisfied by an evaluation point obtained by evaluating the object model of the assembly toy 3 based on the photographed data 661. The evaluation point is defined by a total of a coloring point that is an evaluation point relating to the coloring and a combination point that is an evaluation point relating to a combination of the candidate models, as illustrated in FIG. 10, for example. The evaluation point can be calculated including a point or a deduction based on other evaluation criteria in a calculation element. Alternatively, only one of the coloring point and the combination point may be used.

The coloring point is determined based on coloring point determination criterion data 580 prepared beforehand. The coloring point determination criterion data 580 is prepared for each application requirement 581, and stores, in association with the application requirement 581, a given coloring point 582 to be given when the application requirement is satisfied.

The application requirement 581 in the coloring point determination criterion data 580 is described using a list of colors used in the coloring, an area ratio of the colors, a relative positional relationship of the colors, for example. The coloring may be determined using dictionary data for the image recognition, and the application requirement may be described using a determination result. For example, when the game is the match game using the robot weapon or the like, the application requirement may be set using a type of MultiCum (camouflage) pattern determined based on dictionary data of the MultiCum pattern.

Although the given coloring point 582 may be set as appropriate, a higher point can be given as a color arrangement is more preferable in view of chromatics.

The combination point is determined based on combination point determination criterion data 585. The combination point determination criterion data 585 is prepared for each application requirement 586, and stores, in association with the application requirement 586, a given combination point 587 to be given when the application requirement is satisfied.

The application requirement 586 in the combination point determination criterion data 585 defines a condition required to be satisfied in relation to the type of the candidate model of the each part of the object model recognized by the image recognition. Accordingly, data of the application requirement 586 is described as a list including a main body section type, a left arm type, a right arm type, a left leg type, and a right leg type, for example.

The given combination point 587 may be set as appropriate.

Referring back to FIG. 9, the candidate model combination condition 535 defines a condition required to be satisfied in relation to the types of the candidate models included in the virtual model of the assembly toy 3, that is, a condition required to be satisfied in relation to the image recognition result 663 (see FIG. 7). Accordingly, data of the candidate model combination condition 535 is described as a list including a main body section type, a left arm type, a right arm type, a left leg type, and a right leg type, for example.

Sub-conditions (the player information condition 533, the evaluation point condition 534, and the candidate model combination condition 535 in an example in FIG. 9) in the use permission requirement 532 can all be set to "none" or "practically unlimited".

The preset coloring data 536 defines a color arrangement pattern of an outer surface of the relevant candidate model. For example, the preset coloring data 536 can be texture data.

When the use permission requirement 532 of the preset coloring definition data 530 is satisfied, the coloring ID 531 of this preset coloring definition data 530 is listed in an available preset coloring list 665 and stored in the server system 1100.

Then, the preset coloring data 536 indicated by the available preset coloring list 665 is presented to the player 2 with object coloring data 614 as options for color alteration of the virtual model.

The object coloring data 614 is texture data of an actual color of the assembly toy 3 (the object model) read from the photographed data 661.

Figure 11:
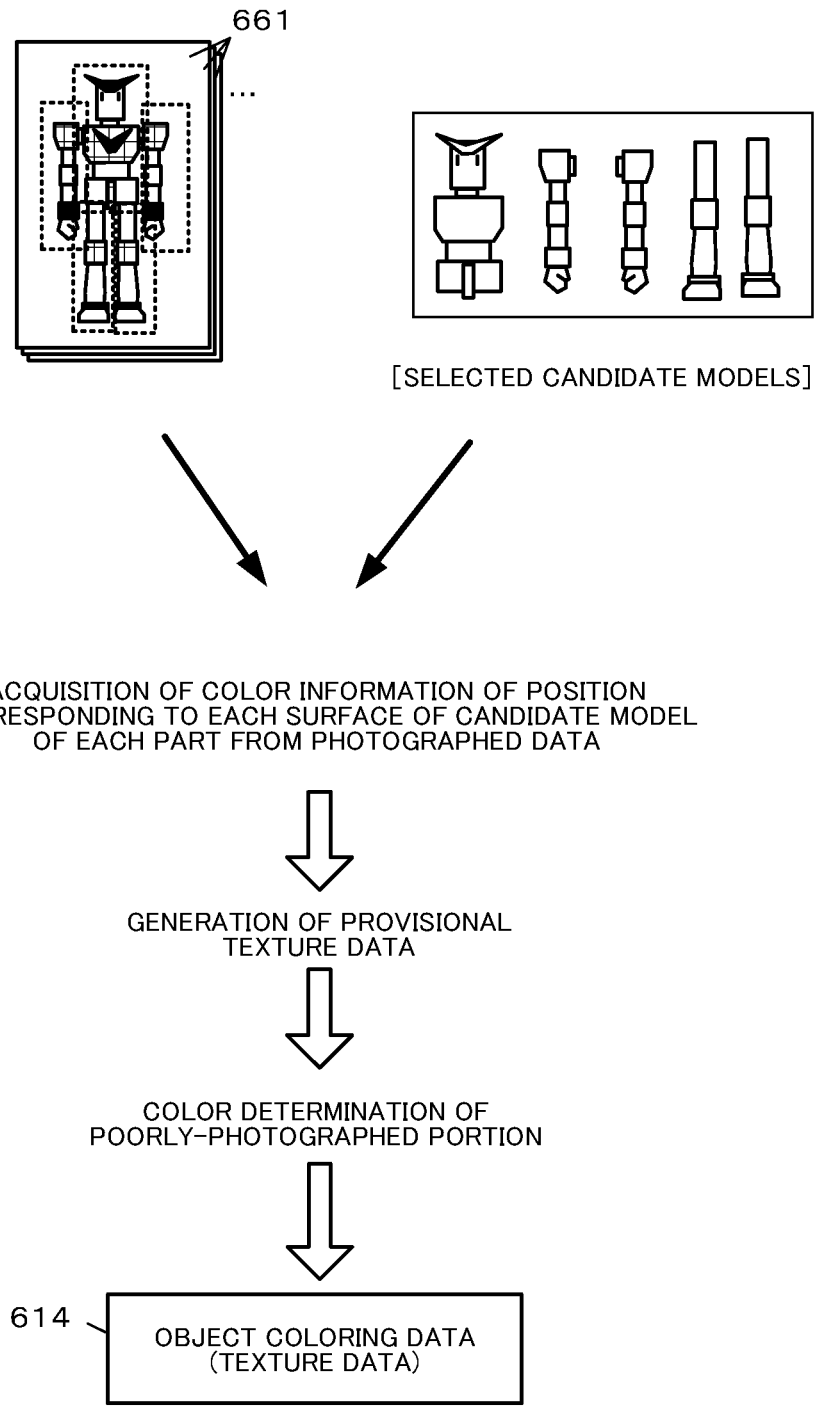
FIG. 11 is a diagram illustrating generation of object coloring data.

As illustrated in FIG. 11, the server system 1100 reads color information of a position of the assembly toy 3 (the object model) corresponding to each position of the selected candidate model from the photographed data 661, and generates provisional object coloring data. Then, the server system 1100 determines a color of a poorly-photographed portion in the provisional object coloring data to generate the object coloring data 614.

A method for determining the color of the poorly-photographed portion may be set as appropriate. For example, a color of a position near the poorly-photographed portion may be copied, or a color complemented as appropriate from a surrounding color may be used. Alternatively, a part of the character in the original work corresponding to the poorly-photographed portion may be searched in the coloring of the character in the original work, and color information of this part may be copied.

Referring back to FIG. 9, the coloring selected by the player 2 from the object coloring data 614 and the coloring listed in the available preset coloring list 665 is stored in the server system 1100 as applied coloring data 615 to be applied when the virtual model is disposed in a virtual space.

That is, options for the coloring alteration applicable to the virtual model based on the player information can be presented to the player 2, and data of the virtual model can be generated by altering the virtual model based on a selection operation by the player.

Next, a motion control of the virtual model of the object model is described.

Figure 12:
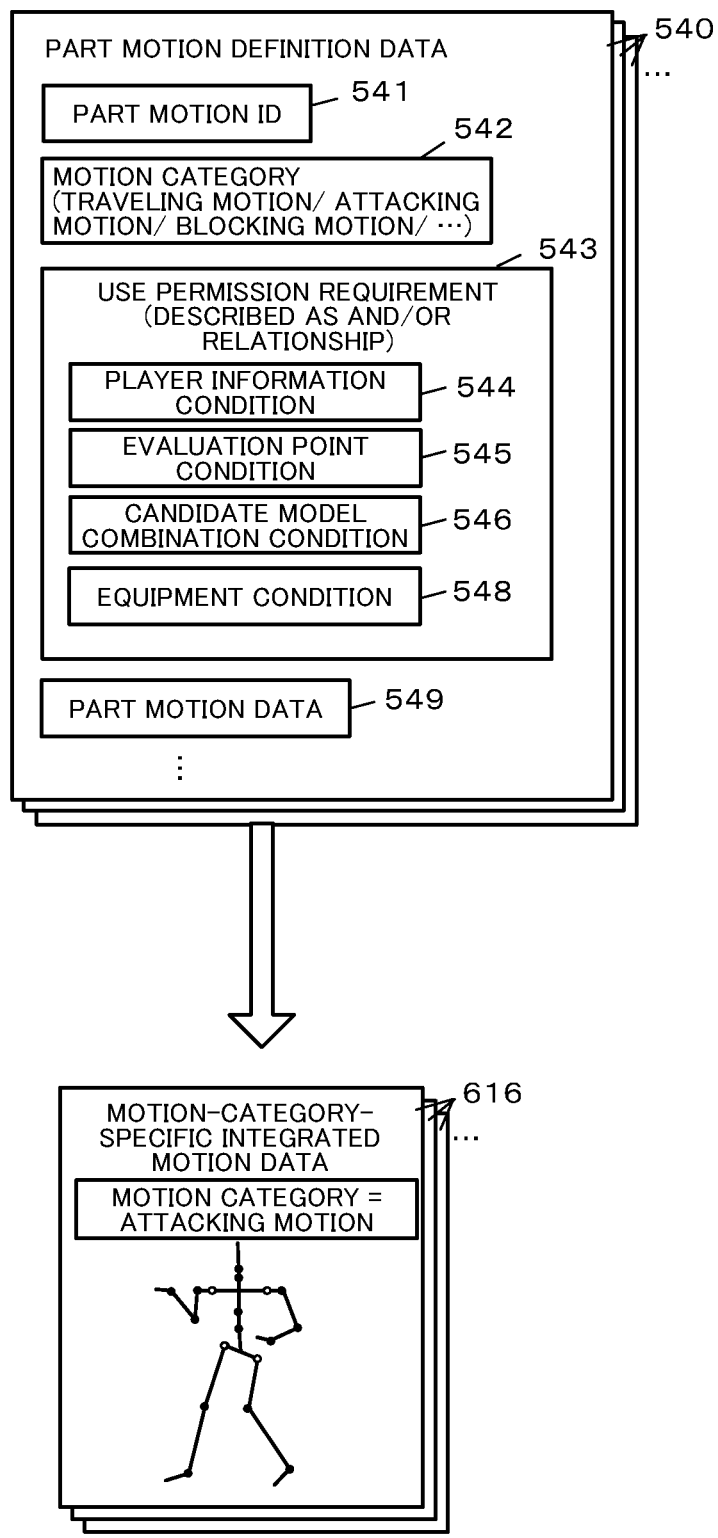
FIG. 12 is a diagram illustrating a data configuration example of part motion definition data, and alteration of motion.

As illustrated in FIG. 12, the part motion definition data 540 is previously prepared for each candidate model. The part motion definition data 540 stores a unique motion ID 541, a motion category 542 indicating a category of a basic motion (e.g., traveling, attacking, blocking, . . . ) of the character that a relevant motion belongs to, a use permission requirement 543 of this definition data, and part motion data 549. Other types of data can be included as appropriate, of course.

The use permission requirement 543 is described as an AND or OR relationship of a player information condition 544, an evaluation point condition 545, a candidate model combination condition 546, and an equipment condition 548 relating to the equipment 5 (see FIG. 4) that the character of the virtual model based on the object model is equipped with. The use permission requirement 543 is described similarly to the use permission requirement 532 of the preset coloring definition data 530 (see FIG. 9).

The part motion data 549 is motion data of the relevant part.

The server system 1100 selects, according to the type of the each part, the part motion data 549 in the part motion definition data 540 whose use permission requirement 543 is satisfied, retrieves the part motion data 549 in the same motion category 542 across all the parts, and connects and integrates the retrieved data through the bone connecting points 8 of the relevant parts so as to generate motion-category-specific integrated motion data 616.

Figure 13A:
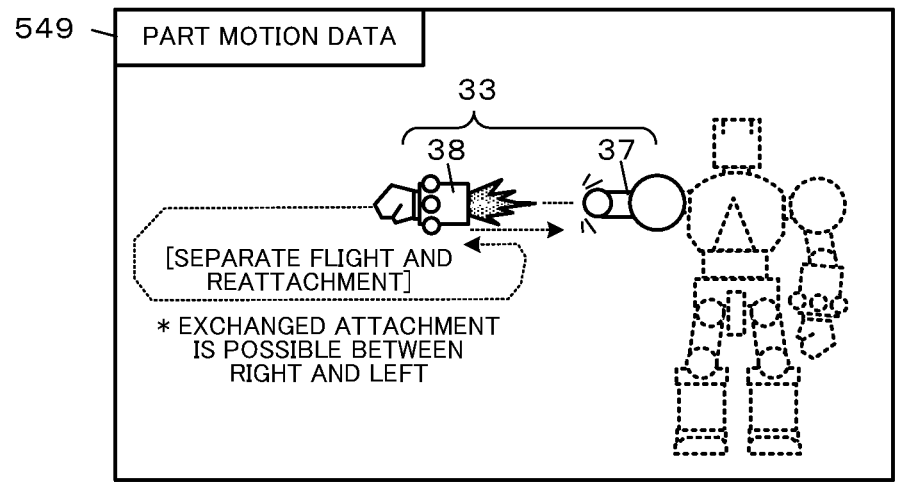
FIG. 13A is a diagram illustrating settings of a separable part and an expandable/contractible part.
Figure 13B:
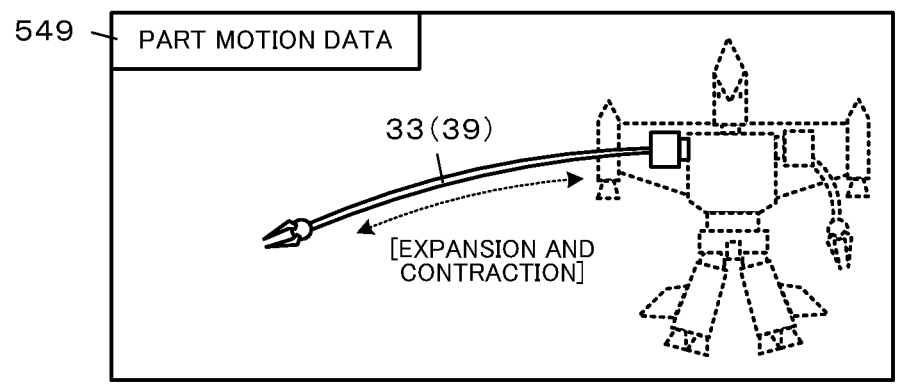
FIG. 13B is a diagram illustrating settings of a separable part and an expandable/contractible part.

As illustrated in FIGS. 13A and 13B, the candidate model data 525 (see FIG. 8) can include a setting of the separable part or the expandable/contractible part, depending on the part of the candidate model.

In particular, the "separable part" is separated from a base portion of the candidate model, and is independently motion-controlled in appearance, as one usage of the part of the relevant candidate model.

In an example of FIG. 13A, the right arm section 32 includes a base part 37 from an elbow to a shoulder and a separable part 38 from the elbow to a hand, and the separable part 38 is controlled to fly to be a so-called "rocket punch". That is, the separable part 38 becomes an attacking medium that flies toward and hits an attack target, and the part motion data 549 defines motions of flying toward the attack target and returning and reattaching to an original position. When a plurality of separable parts are defined and the plurality of separable parts have an identical shape, or when no problem occurs if attachment positions of the plurality of separable parts change between before and after the separation, a motion control may be performed such that the attachment positions are switched between the plurality of separable parts when the plurality of separable parts reattach after the separation.

The "expandable/contractible part" is expandable, contractible, and deformable like an elastic body. In an example in FIG. 13B, the right arm section 32 is set as the expandable/contractible part 39. The bone data 526 includes many bones with many joints assigned to the expandable/contractible part, and the part motion data 549 is defined with expanding and contracting motions caused by an expanding process and a folding process in an accordion shape. Alternatively, the expanding and contracting motions may be caused by temporarily changing a length setting of relevant part of the bones.

Next, a setting of a game parameter value relating to the game of the virtual model of the object model is described. The virtual model is used as the player character in the game. Accordingly, the virtual model is set with the game parameter value relating to the game.

The "game parameter value" is a parameter value of various types set in relation to the virtual model in a game progress control. For example, in the match game, the game parameter value corresponds to physical endurance (so-called HP), fighting strength, defensive strength, moving speed, or the like. Furthermore, according to the present embodiment, since the virtual model is used as the player character, the game parameter value also includes a parameter value relating to the motion control of the player character.

Since the assembly toy 3 is a toy of the character in the original work, an initial value of the game parameter value is previously set by a game creator in accordance with a position (e.g., relative strength) of the character in the world of the original work.

The server system 1100 determines which original work the character of the assembly toy 3 belongs to based on the character type 523 (see FIG. 8) of the candidate model of the main body section 31 (see FIG. 4), and adopts the initial value of the character to begin with. Then, in view of that the assembly toy 3 can be assembled by combining the parts from different packages 4, the server system 1100 makes an alteration (a change) according to the combination of the candidate models, the player information, the evaluation result of the assembly toy 3, or the like to the initial value so as to set a part-specific applied parameter value to be actually applied to the virtual model.

Figure 14:
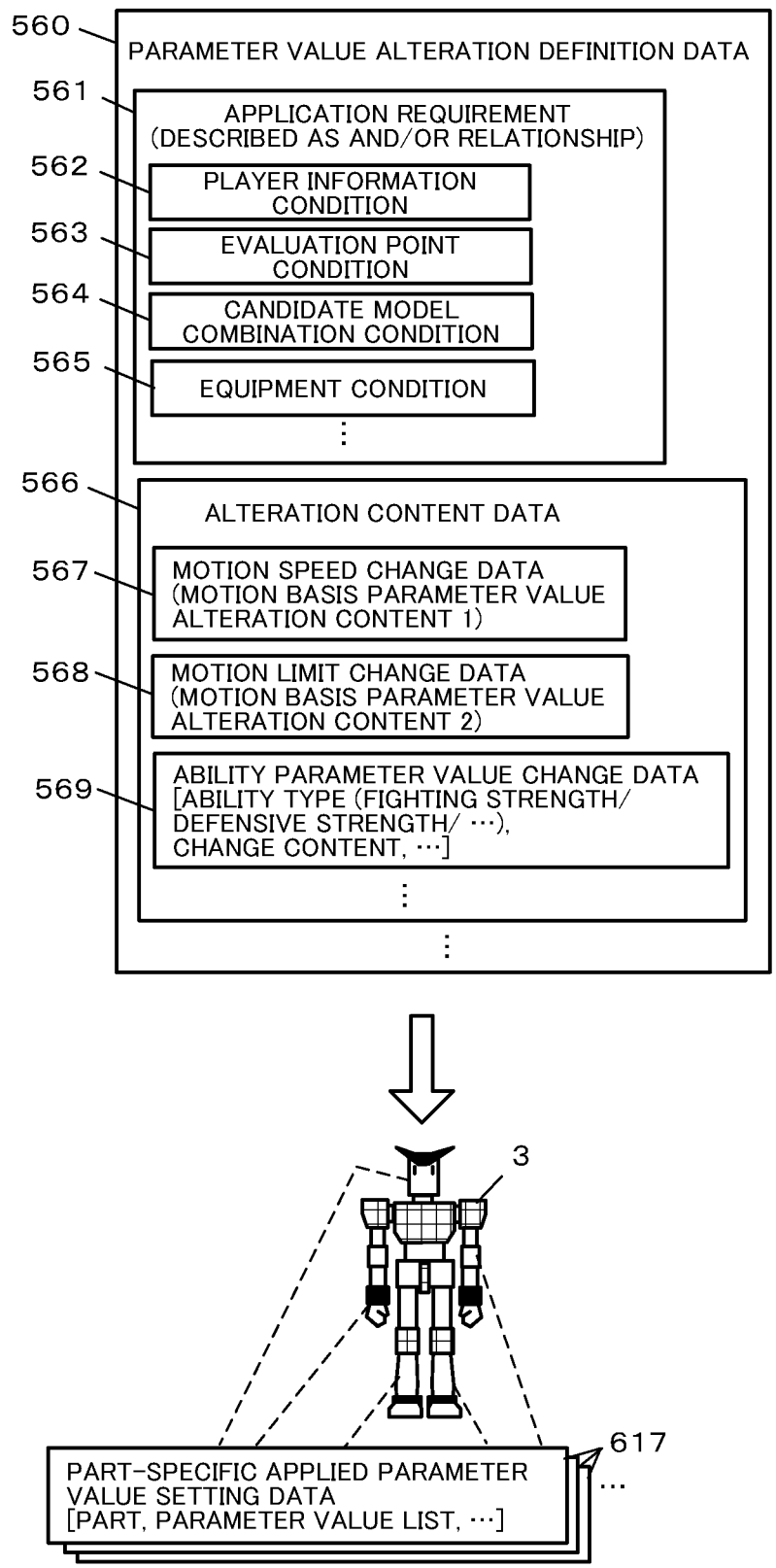
FIG. 14 is a diagram illustrating a data configuration example of parameter value alteration definition data, and alteration of a parameter value.

In particular, as illustrated in FIG. 14, the parameter value alteration definition data 560 is prepared for each candidate model (an existing model of the each part of the virtual model, selected for forming the virtual model through the image recognition of the object model). One piece of parameter value alteration definition data 560 includes an application requirement 561 and alteration content data 566. Other types of data can be included as appropriate, of course.

The application requirement 561 defines a condition required to be satisfied to apply the relevant definition data. The application requirement 561 is described as an AND or OR relationship of a player information condition 562, an evaluation point condition 563, a candidate model combination condition 564, and an equipment condition 565. The application requirement 561 is described similarly to the use permission requirement 532 of the preset coloring definition data 530 (see FIG. 9).

The alteration content data 566 defines content as to which game parameter value to alter and how to alter when a candidate object for which the relevant parameter value alteration definition data 560 is set is selected, and the application requirement 561 is satisfied. For example, the alteration content data 566 includes motion speed change data 567, motion limit change data 568, ability parameter value change data 569 for each ability type.

The motion speed change data 567 defines a change in reproduction speed of the motion of the relevant candidate object. The motion limit change data 568 defines a change in a motion limit of the joint (e.g., flexibility or a movable range of the joint) of the bone data 526 (see FIG. 8) of the relevant candidate object. That is, the change data defines the alteration to the parameter value serving as a basis of the motion control of the virtual model in the game space.

The ability parameter value change data 569 is prepared for each ability parameter (each game parameter) indicating an ability of the character of the virtual model in the game. Although FIG. 14 shows only one piece of ability parameter value change data 569, a plurality of pieces of ability parameter value change data 569 may be set. One piece of ability parameter value change data 569 stores an ability type as a change target and content of the change in an associated manner.

The server system 1100 generates part-specific applied parameter value setting data 617 for the each part, and initializes the part-specific applied parameter value setting data 617 to the initial parameter value of the character indicated by the character type 523 of the candidate model of the main body section 31. Then, the server system 1100 changes, for the each part, the part-specific applied parameter value setting data 617 from the initial value in accordance with the alteration content data 566 in the parameter value alteration definition data 560 whose application requirement 561 is satisfied.

Next, an object attached to the virtual model is described.

The virtual model of the player character is set as the robot weapon, and thus the object to be attached is the equipment 5 (see FIG. 4) for an attack or defense of the robot weapon.

Figure 15:
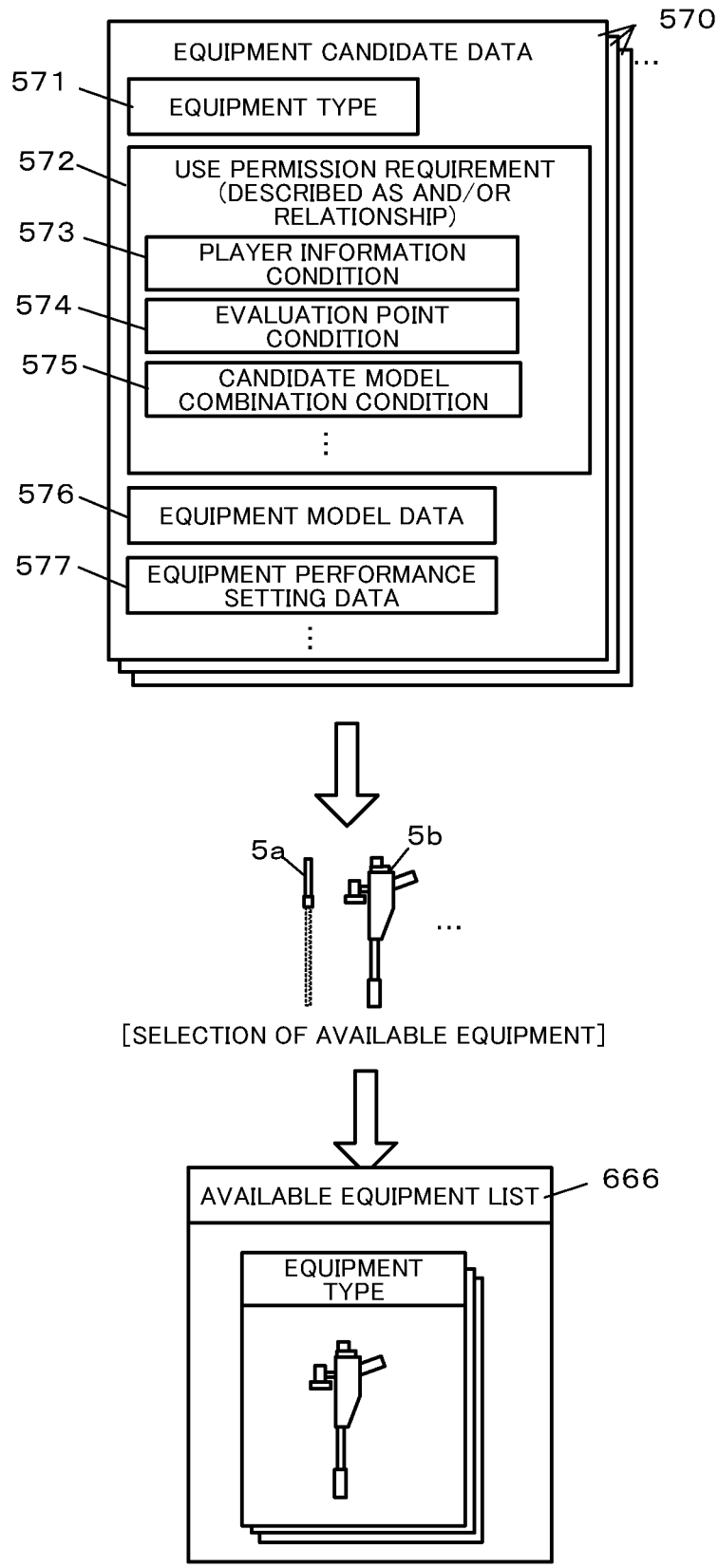
FIG. 15 is a diagram illustrating a data configuration example of equipment candidate data, and an accessary.

As illustrated in FIG. 15, equipment candidate data 570 is previously prepared for each type of the equipment 5. One piece of equipment candidate data 570 includes a unique equipment type 571, a use permission requirement 572, equipment model data 576, and equipment performance setting data 577. Other types of data can be included as appropriate, of course.

The use permission requirement 572 defines a condition required to be satisfied to apply the relevant definition data. The use permission requirement 572 is described as an AND or OR relationship of a player information condition 573, an evaluation point condition 574, and a candidate model combination condition 575. The use permission requirement 572 is described similarly to the use permission requirement 532 of the preset coloring definition data 530 (see FIG. 9).

The server system 1100 selects the equipment 5 (see FIG. 4) of the equipment candidate data 570 whose use permission requirement 572 is satisfied, and registers the selected equipment 5 in an available equipment list 666 of the virtual model of the assembly toy 3. Then, the server system 1100 presents the equipment 5 registered in the available equipment list 666 to the player 2 as options, and attaches the selected equipment 5 to the virtual model of the assembly toy 3 so as to have the virtual model equipped with the selected equipment 5.

Figure 16:
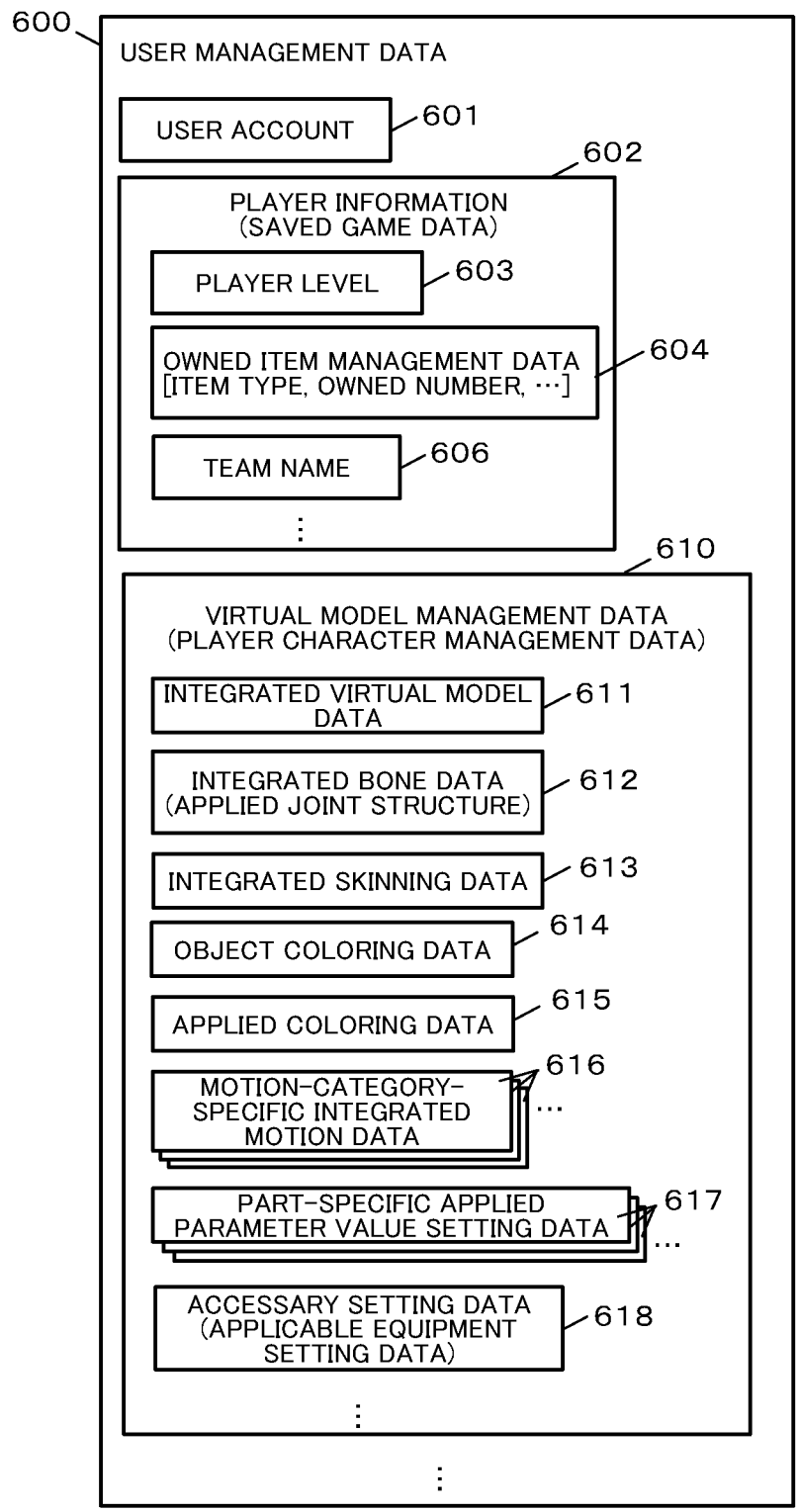
FIG. 16 is a diagram illustrating a data configuration example of user management data.

The server system 1100 stores and manages various types of data relating to the virtual model set accordingly in user management data 600 of the player 2 as illustrated in FIG. 16. In particular, the user management data 600 of one player 2 includes a unique user account 601, player information 602, and virtual model management data 610. Other types of data can be included as appropriate, of course.

The player information 602 includes a player level 603, owned item management data 604 for each owned item, and a team name 606 that the player belongs to. The team name 606 can be provided as appropriate if the game content is for a game that the players play in teams, or that the player belongs to any one of forces in the game world.

The virtual model management data 610 stores various types of data relating to the virtual model generated by photographing the assembly toy 3 of the relevant player. According to the present embodiment, since the virtual model is used as the player character, the virtual model management data 610 corresponds to player character management data. In particular, the virtual model management data 610 includes: the integrated virtual model data 611, the integrated bone data 612, and the integrated skinning data 613 (see FIG. 7); the object coloring data 614 (see FIG. 11); the applied coloring data 615 (see FIG. 9); the motion-category-specific integrated motion data 616 (see FIG. 12); the part-specific applied parameter value setting data 617;

and accessary setting data 618 defining the equipment 5 (see FIG. 4) or the like applicable to the virtual model.

Next, a functional configuration is described.

Figure 17:
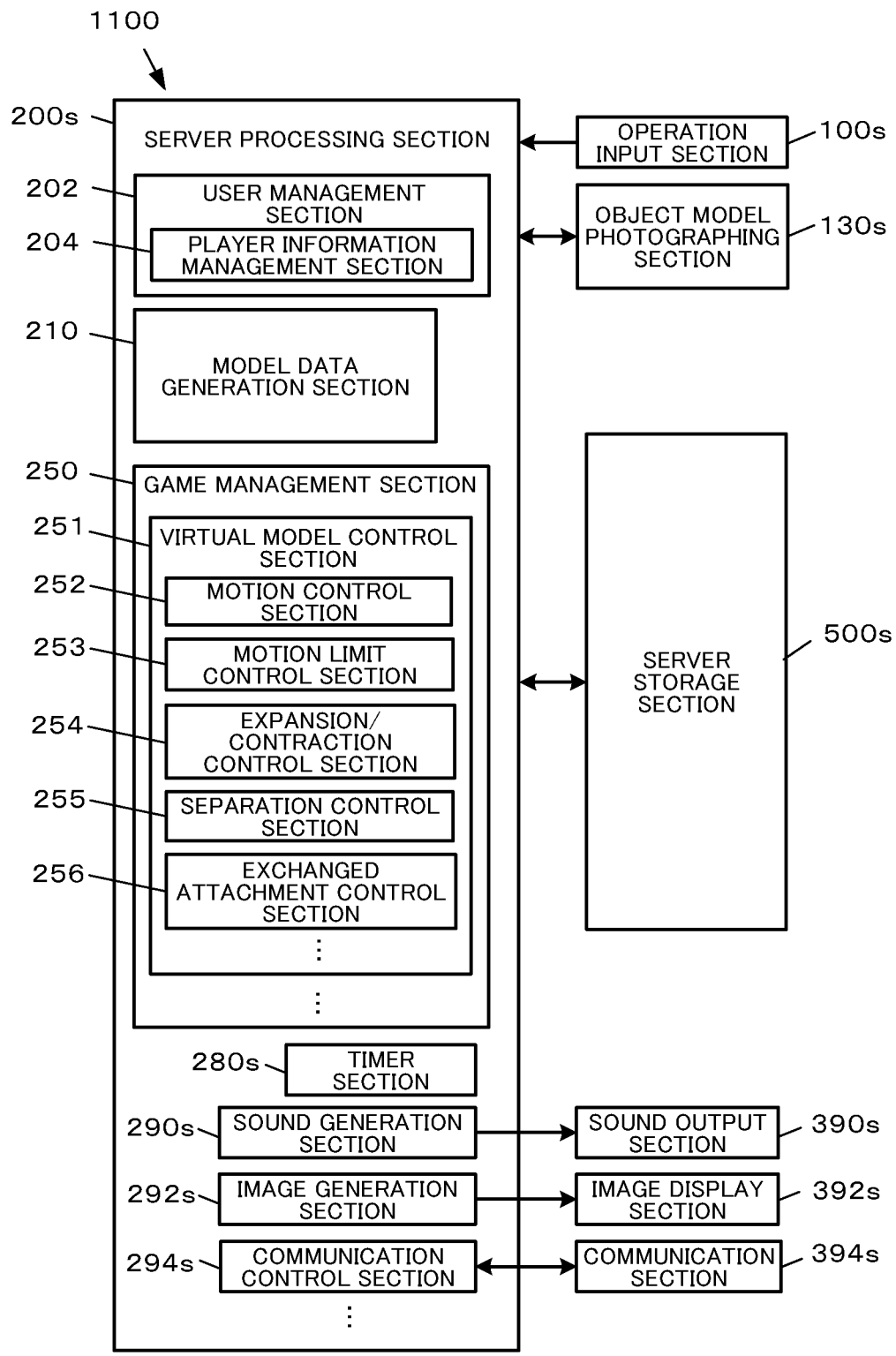
FIG. 17 is a functional block diagram illustrating a functional configuration example of a server system according to a first embodiment.

FIG. 17 is a functional block diagram illustrating a functional configuration example of the server system 1100. The server system 1100 includes an operation input section 100s, an object model photographing section 130s, a server processing section 200s, a sound output section 390s, an image display section 392s, a communication section 394s, and a server storage section 500s.

The operation input section 100s is a means for inputting various operation for server management. The operation input section 100s corresponds to the keyboard 1106 in FIG. 1.

The object model photographing section 130s performs the whole circumference photographing of the object model (the assembly toy 3) serving as original data for generating the virtual model, and outputs data of a photographed image to the server processing section 200s. The object model photographing section 130s corresponds to the whole circumference photographing device 1130 in FIG. 1.

The server processing section 200s is implemented, for example, by a processor that is a calculation circuit such as a CPU, a GPU, an ASIC, or a FPGA and an electronic component such as an IC memory. The server processing section 200s controls input/output of data with respect to functional sections including the operation input section 100s and the server storage section 500s. The server processing section 200s performs various calculation processes based on predetermined programs and data, operation input signals from the operation input section 100s, data received from the player terminal 1500, or the like to comprehensively control the operation of the server system 1100.

The server processing section 200s includes a user management section 202, a model data generation section 210, a game management section 250, a timer section 280s, a sound generation section 290s, an image generation section 292s, and a communication control section 294s. Other functional sections may be included as appropriate, of course.

The user management section 202 performs a process relating to a user registration procedure, and stores and manages various types of information associated with a user account. In particular, the user management section 202 performs (1) issuing a unique user account to a registered user, and (2) registration information management for registering and managing personal information for each user account. The user management section 202 includes a player information management section 204.

The player information management section 204 stores and manages information relating to the player 2 as the registered user, that is, the player information 602 (see FIG. 16). For example, the player information management section 204 sets the player level 603 in accordance with the play performance, and manages the owned item management data 604 in accordance with acquisition and consumption of items.

Figure 18:
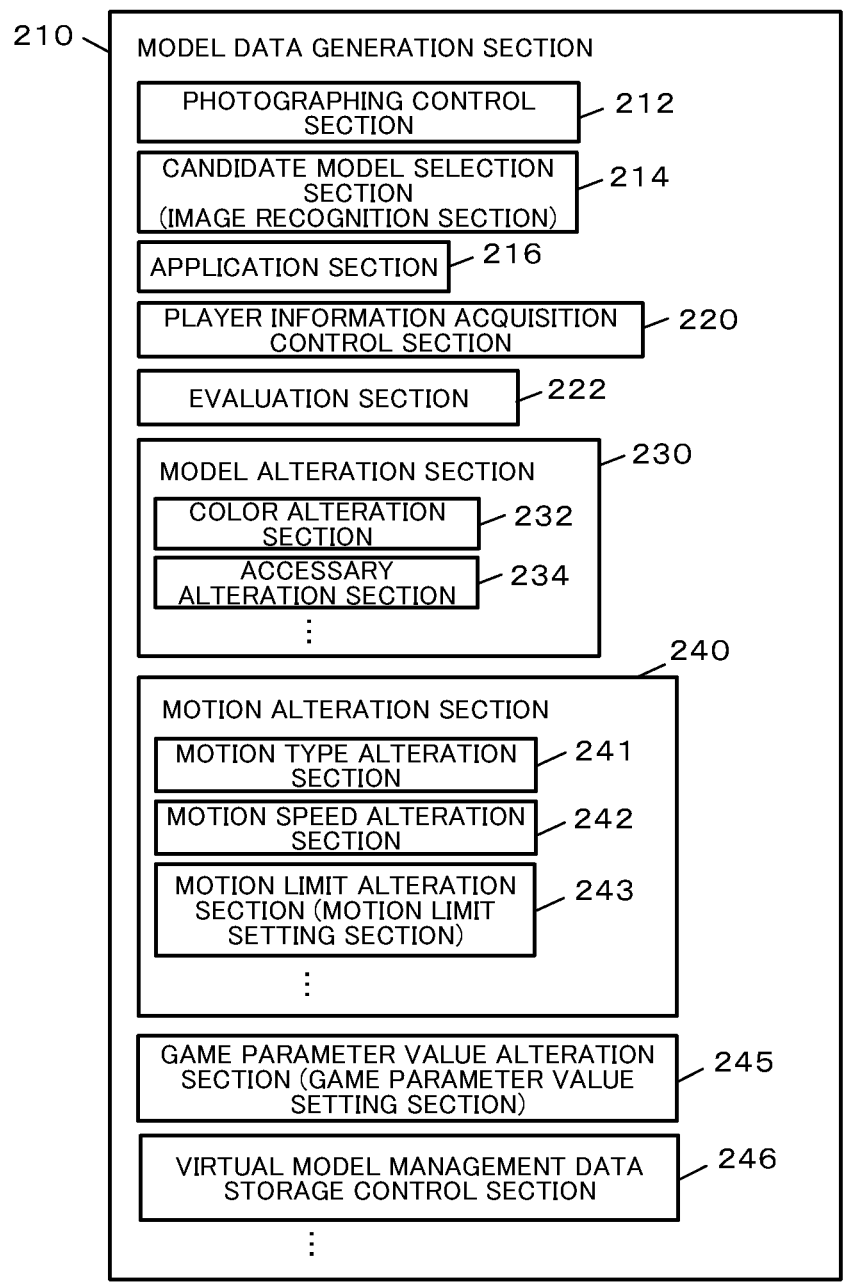
FIG. 18 is a functional block diagram illustrating a functional configuration example of a model data generation section.

The model data generation section 210 generates the model data of the virtual model imitating the object model based on the photographed data obtained by photographing the object model including the joint structure. In particular, as illustrated in FIG. 18, the model data generation section 210 includes a functional section that generates the model data for forming the three-dimensional virtual model based on the photographed data. In particular, the model data generation section 210 includes a photographing control section 212, a candidate model selection section 214, an application section 216, a player information acquisition control section 220, an evaluation section 222, a model alteration section 230, a motion alteration section 240, a game parameter value alteration section 245, and a virtual model management data storage control section 246.

The photographing control section 212 controls the operation of the whole circumference photographing device 1130 (see FIG. 2) so as to control the acquisition of the photographed data 661 (including not only one piece of photographed data, but also a plurality of pieces of photographed data) of the whole circumference of the object model (the assembly toy 3 prepared by the player 2). Then, the photographing control section 212 performs a storage control of the one or plurality of pieces of photographed data 661 obtained.

The candidate model selection section 214 selects the candidate model that matches the photographed object model from the plurality of candidate models. In particular, the candidate model selection section 214 refers to the candidate model image recognition dictionary library 510 and performs the image recognition process based on the photographed data 661 so as to select the candidate model that matches the photographed object model from the plurality of candidate models (see FIG. 6). Accordingly, the candidate model selection section 214 acquires the image recognition result 663 by the image recognition process. Thus, the candidate model selection section 214 can be considered as an image recognition section.

The application section 216 applies a given applied joint structure to the virtual model.

In particular, each of the candidate models is set with the candidate model definition data 521 (see FIG. 8) including the bone data 526 serving as the definition data of the applied joint structure. Meanwhile, which candidate model the each part of the assembly toy 3 corresponds to is determined by the image recognition, and thus the selection of the candidate model is practically application of the applied joint structure. That is, the application section 216 selects an applied joint structure candidate corresponding to the candidate model selected by the candidate model selection section 214, and applies the selected applied joint structure candidate as the applied joint structure.

The player information acquisition control section 220 acquires the player information 602 of the player 2 in relation to the game.

The evaluation section 222 evaluates the object model of the assembly toy 3 based on the photographed data 661.

The model alteration section 230 alters an appearance of the virtual model based on the player information 602 (see FIG. 16) or the like. In particular, the model alteration section 230 presents options for the alteration of the virtual model based on the player information 602 to the player, and alters the virtual model based on the selection operation by the player.

More particularly, the model alteration section 230 includes a color alteration section 232 and an accessary alteration section 234.

In order to alter the coloring of the virtual model, the color alteration section 232 presents the available preset coloring list 665 and the object coloring data 614 to the player 2 as the options, and determines the applied coloring data 615 so as to determine how to alter the coloring (see FIG. 9).

In order to alter an accessary of the virtual model, the accessary alteration section 234 generates the available equipment list 666 (see FIG. 15), presents the equipment 5 in the list to the player as the options based on the player information 602, and attaches the equipment model data 576 of the selected equipment 5 to the virtual model of the assembly toy 3 so as to equip the virtual model with the selected equipment 5. This corresponds to an example of presentation of the options for the alteration.

The motion alteration section 240 alters the motion of the virtual model based on the player information 602 (see FIG. 16) or the like. In particular, the motion alteration section 240 includes a motion type alteration section 241, a motion speed alteration section 242, and a motion limit alteration section 243, and sets and changes a parameter value serving as a basis of the motion control of the virtual model.

The motion type alteration section 241 alters the type of the motion itself. In particular, the motion type alteration section 241 generates the motion-category-specific integrated motion data 616 (see FIG. 12).

The motion speed alteration section 242 alters the motion speed when the motion is reproduced.

The motion limit alteration section 243 is a motion limit setting section that sets the motion limit of the joint relating to the applied joint structure.

Results of functions of these alteration sections become the part-specific applied parameter value setting data 617 (see FIG. 14).

The game parameter value alteration section 245 alters the game parameter value relating to the game of the virtual model based on the player information 602 (see FIG. 16), an evaluation result by the evaluation section 222, or the like. In particular, the game parameter value alteration section 245 generates the part-specific applied parameter value setting data 617. Accordingly, the game parameter value alteration section 245 is also a game parameter value setting section.

The virtual model management data storage control section 246 performs a control for storing the virtual model management data 610 (see FIG. 16) including the model data and data of the applied joint structure in the server storage section 500s as data for disposing the virtual model based on the model data in a given virtual space and causing the joints of the virtual model to function in accordance with the applied joint structure.

Referring back to FIG. 17, the game management section 250 performs a progress control of the game or the like. The game management section 250 includes a virtual model control section 251.

The virtual model control section 251 disposes the virtual model and causes the virtual model to move based on the virtual model management data 610 (see FIG. 16) in a three-dimensional virtual space serving as a game space. In particular, the virtual model control section 251 includes a motion control section 252, a motion limit control section 253, an expansion/contraction control section 254, a separation control section 255, and an exchanged attachment control section 256.

The motion control section 252 causes the joints relating to the applied joint structure to function based on given motion data so as to control the virtual model.

The motion limit control section 253 performs a motion control of the joints based on the motion data within a range of the set motion limit.

The expansion/contraction control section 254 performs a control for partly expanding and contracting the virtual model (see FIG. 13).

The separation control section 255 performs a control for separating and reattaching the separable part 38 of the virtual model (see FIG. 13A).

The exchanged attachment control section 256 performs a control for attaching a given different part exchangeable with the separable part 38 to the virtual model in place of the separable part 38 separated by the separation control section 255 (see FIG. 13A).

The timer section 280s uses a system clock to measure a current date and time, a limited time period, and others.

The sound generation section 290s is implemented by execution of an IC or software for generating sound data and decoding, and generates or decodes sound data of operational sounds, sound effects, BGM, voice speech, or the like related to system management of the server system 1100, or the game. The sound generation section 290s outputs sound signals related to the system management to the sound output section 390s.

The sound output section 390s emits sound corresponding to the sound signals. The sound output section 390s corresponds to a speaker (not illustrated) included in the main body device or the touch panel 1108 in FIG. 1.

The image generation section 292s generates an image to be displayed on the image display section 392s, and outputs an image signal. The image generation section 292s corresponds to a part of a function that generates screens relating to the system management of the server system 1100 and various types of screens relating to the game (or data to display the screens on the player terminal 1500).

The image display section 392s is implemented by a device to display the image such as a flat panel display, a head-mounted display, or a projector. The image display section 392s corresponds to the touch panel 1108 in FIG. 1.

The communication control section 294s performs data processing related to data communication, and implements data exchange with an external device through the communication section 394s.

The communication section 394s connects to the network 9 to implement communication. For example, the communication section 394s is implemented by a transceiver, a modem, a terminal adaptor (TA), a jack for wired communication cable, a control circuit, or the like. The communication section 394s corresponds to the communication device 1153 in FIG. 1.

The server storage section 500s stores programs and various types of data for implementing various functions for causing the server processing section 200s to comprehensively control the server system 1100. The server storage section 500s is used as a work area for the server processing section 200s, and temporarily stores results of calculations executed by the server processing section 200s in accordance with various types of programs. This function is implemented by an IC memory such as a RAM or a ROM, a magnetic disk such as a hard disk, an optical disk such as a CD-ROM or a DVD, an online storage, or the like. The server storage section 500s corresponds to the storage media such as the IC memory 1152 and the hard disk included in the main body device and the storage 1140 in FIG. 1.

Figure 19:
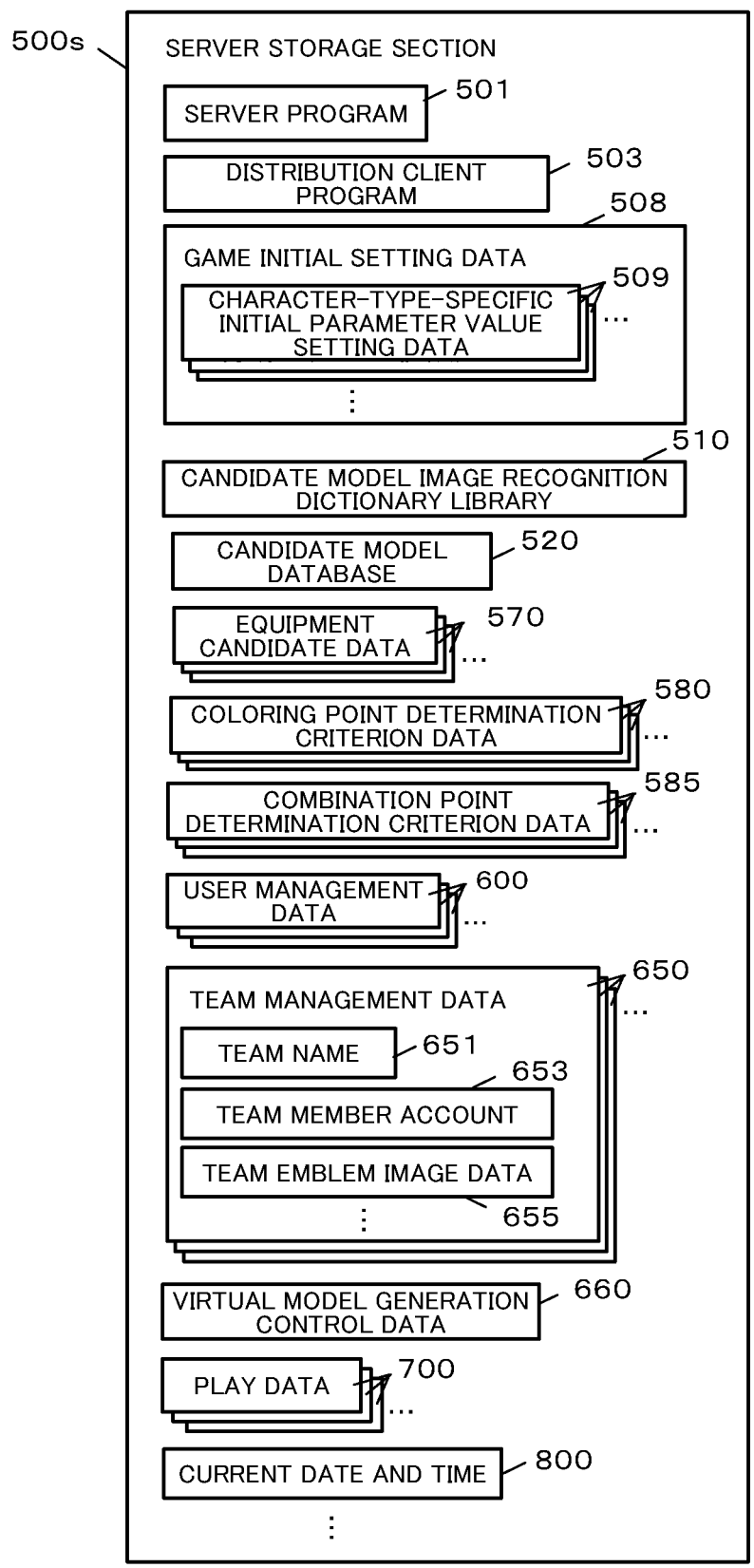
FIG. 19 is a diagram illustrating an example of programs and data stored in a server storage section according to the first embodiment.

FIG. 19 is a diagram illustrating an example of the programs and data stored in the server storage section 500s. The server storage section 500s according to the present embodiment stores a server program 501, a distribution client program 503, game initial setting data 508, the candidate model image recognition dictionary library 510, the candidate model database 520, the equipment candidate data 570, the coloring point determination criterion data 580, and the combination point determination criterion data 585.

The server storage section 500s stores sequentially generated and managed data such as the user management data 600, team management data 650, virtual model generation control data 660, play data 700, and a current date and time 800. The server storage section 500s can also store other programs and data (e.g., a timer, a counter, or various flags) as appropriate.

The server program 501 is read out and executed by the sever processing section 200s for implementing functions of the user management section 202, the model data generation section 210, and the game management section 250.

The distribution client program 503 is an original of a client program to be provided to the player terminal 1500.

The game initial setting data 508 includes various types of initial setting data required for an execution control of the game.

In particular, the game initial setting data 508 includes character-type-specific initial parameter value setting data 509. The game initial setting data 508 also includes other data such as game space definition data defining the game space as appropriate, of course.

The team management data 650 is set for each team when the game is played in a style that the player 2 belongs to any one of teams or forces. One piece of team management data 650 includes a unique team name 651, a team member account 653, and team emblem image data 655.

Figure 20:
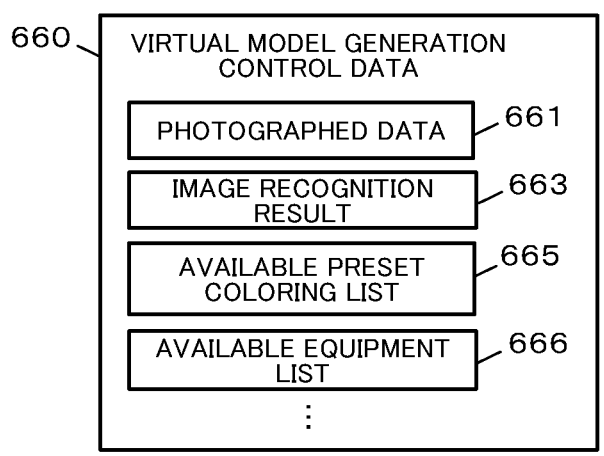
FIG. 20 is a diagram illustrating a data configuration example of virtual model generation control data.

The virtual model generation control data 660 stores various types of data necessary for generating the virtual model of the assembly toy 3. In particular, as illustrated in FIG. 20, the virtual model generation control data 660 includes the photographed data 661, the image recognition result 663, the available preset coloring list 665, and the available equipment list 666. Other types of data can be included as appropriate, of course.

Figure 21:
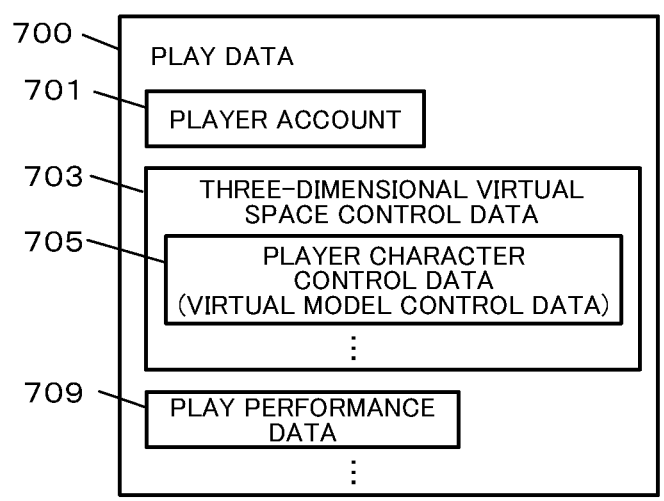
FIG. 21 is a diagram illustrating a data configuration example of play data.

Referring back to FIG. 19, the play data 700 is generated for each gameplay, and stores various types of data for implementing the gameplay. In particular, as illustrated in FIG. 21, one piece of play data 700 includes a player account 701, three-dimensional virtual space control data 703, and play performance data 709. Other types of data can be included as appropriate, of course.

The three-dimensional virtual space control data 703 is a virtual space in which various types of objects included in the game space are disposed. The three-dimensional virtual space control data 703 includes player character control data 705.

Figure 22:
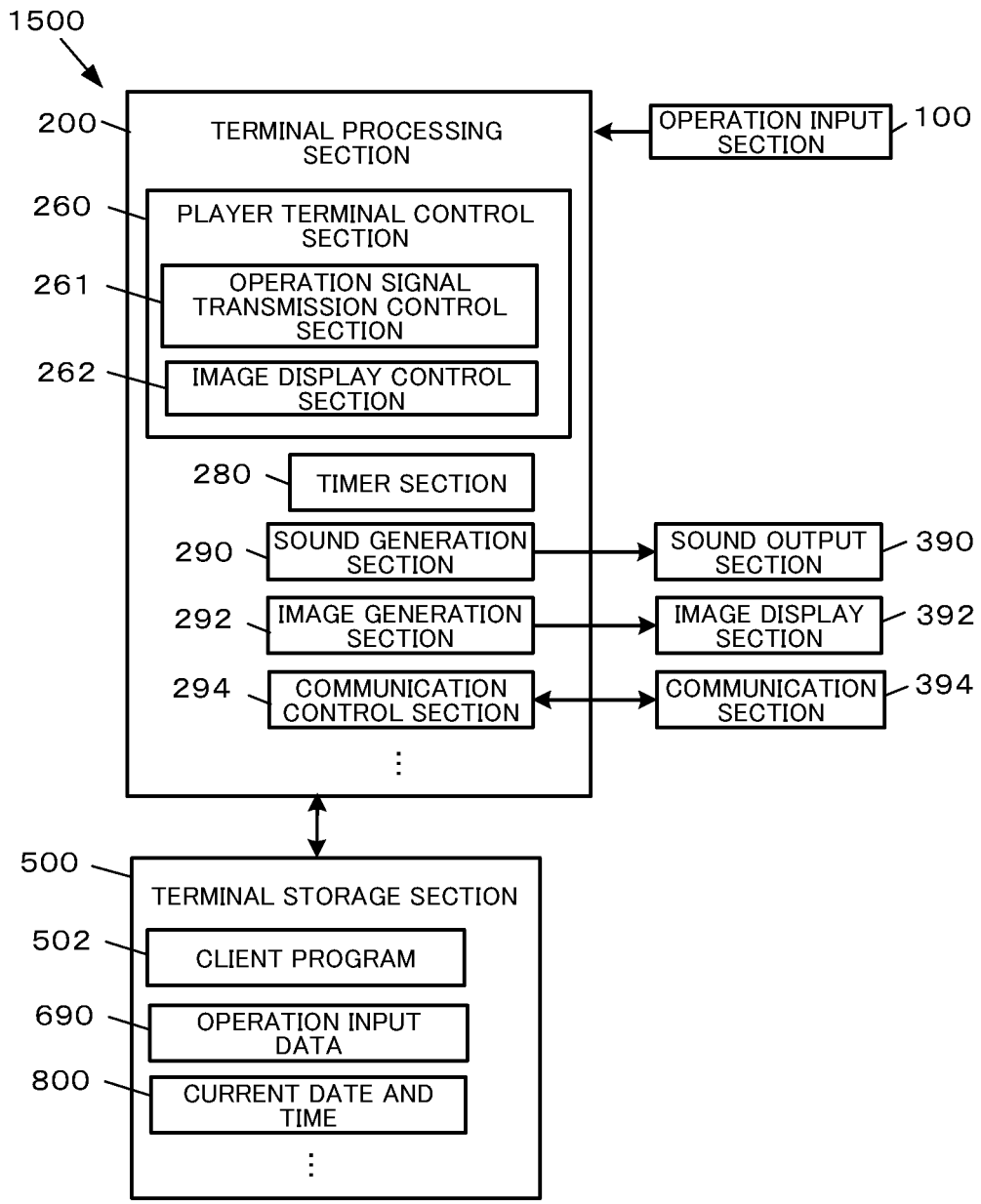
FIG. 22 is a functional block diagram illustrating a functional configuration example of the player terminal according to the first embodiment.

FIG. 22 is a functional block diagram illustrating a functional configuration example of the player terminal 1500. The player terminal 1500 includes an operation input section 100, a terminal processing section 200, a sound output section 390, an image display section 392, a communication section 394, and a terminal storage section 500.

The operation input section 100 outputs operation input signals in accordance with various operation inputs by the user to the terminal processing section 200. The operation input section 100 can be implemented, for example, by a push switch, a joystick, a touch pad, a track ball, an accelerometer, a gyro, or a CCD module. The operation input section 100 corresponds to the arrow key 1502, the button switch 1504, and the touch panel 1506 in FIG. 3.

The terminal processing section 200 is implemented, for example, by a microprocessor such as a CPU or a GPU and electronic components such as an IC memory. The terminal processing section 200 controls input/output of data with respect to the functional sections including the operation input section 100 and the terminal storage section 500. The terminal processing section 200 performs various calculation processes based on a predetermined program or data, operation input signals from the operation input section 100, and various types of data received from the server system 1100 to control operation of the player terminal 1500. The terminal processing section 200 corresponds to the control board 1550 in FIG. 3.

The terminal processing section 200 according to the present embodiment includes a player terminal control section 260, a timer section 280, a sound generation section 290, an image generation section 292, and a communication control section 294.

The player terminal control section 260 performs a control for causing the player terminal 1500 to function as a client device that communicates with the server system 1100. In particular, the player terminal control section 260 includes an operation signal transmission control section 261 and an image display control section 262.

The operation signal transmission control section 261 performs a process of transmitting various types of data and requests to the server system 1100 in accordance with operation performed on the operation input section 100.

The image display control section 262 performs a control for displaying a game screen, various types of operation screens, or the like based on various types of data or the like received from the server system 1100.

The timer section 280 uses a system clock to measure a current date and time, a limited time period, or the like.

The sound generation section 290 is implemented, for example, by a processor such as a digital signal processor (DSP) or a sound synthesizing IC, or an audio codec for playing a sound file. The sound generation section 290 generates sound signals for music, sound effects, or various types of operational sounds, and outputs the signals to the sound output section 390.

The sound output section 390 is implemented by a device that outputs (emits) sounds based on the sound signals input from the sound generation section 290. The sound output section 390 corresponds to the speaker 1510 in FIG. 3.

The image generation section 292 generates and composites images, and outputs image signals to display these images on the image display section 392s based on a processing result of the image display control section 262. The image generation section 292 corresponds to the graphics processing unit (GPU) and a graphic controller mounted on the control board 1550 in FIG. 3.

The image display section 392 is implemented by a device for displaying the image such as a flat panel display, a head-mounted display, or a projector. The image display section 392 corresponds to the touch panel 1506 in FIG. 3.

The communication control section 294 performs data processing related to data communication, and implements data exchange with an external device through the communication section 394.

The communication section 394 connects to the network 9 to implement communication. For example, the communication section 394 is implemented by a transceiver, a modem, a terminal adaptor (TA), a jack for wired communication cable, a control circuit, or the like. The communication section 394 corresponds to the wireless communication module 1553 in FIG. 3.

According to the present embodiment, the server system 1100 generates the images of the game screen and various types of screens. However, the player terminal 1500 may generates the images. In such a case, the image display control section 262 controls objects disposed in the three-dimensional virtual space for generating 3DCG, for example, and the image generation section 292 renders the 3DCG, and executes various controls for generating the game screen.

The terminal storage section 500 stores programs and various types of data for causing the terminal processing section 200 to implement given functions. The terminal storage section 500 is also used as a work area for the terminal processing section 200, and temporarily stores results of calculations executed by the terminal processing section 200 in accordance with various programs, input data input from the operation input section 100, or the like. These functions are implemented by an IC memory such as a RAM or a ROM, a magnetic disk such as a hard disk, an optical disk such as a CD-ROM or a DVD. The terminal storage section 500 corresponds to the IC memory 1552 mounted on the control board 1550 and the memory card 1540 in FIG. 3. The terminal storage section 500 may be implemented by an online storage.

In particular, the terminal storage section 500 stores a client program 502 for causing the terminal processing section 200 to function as the player terminal control section 260, operation input data 690, and a current date and time 800. Other types of data can be stored as appropriate, of course.

Next, operation of the game system 1000 is described.

Figure 23:
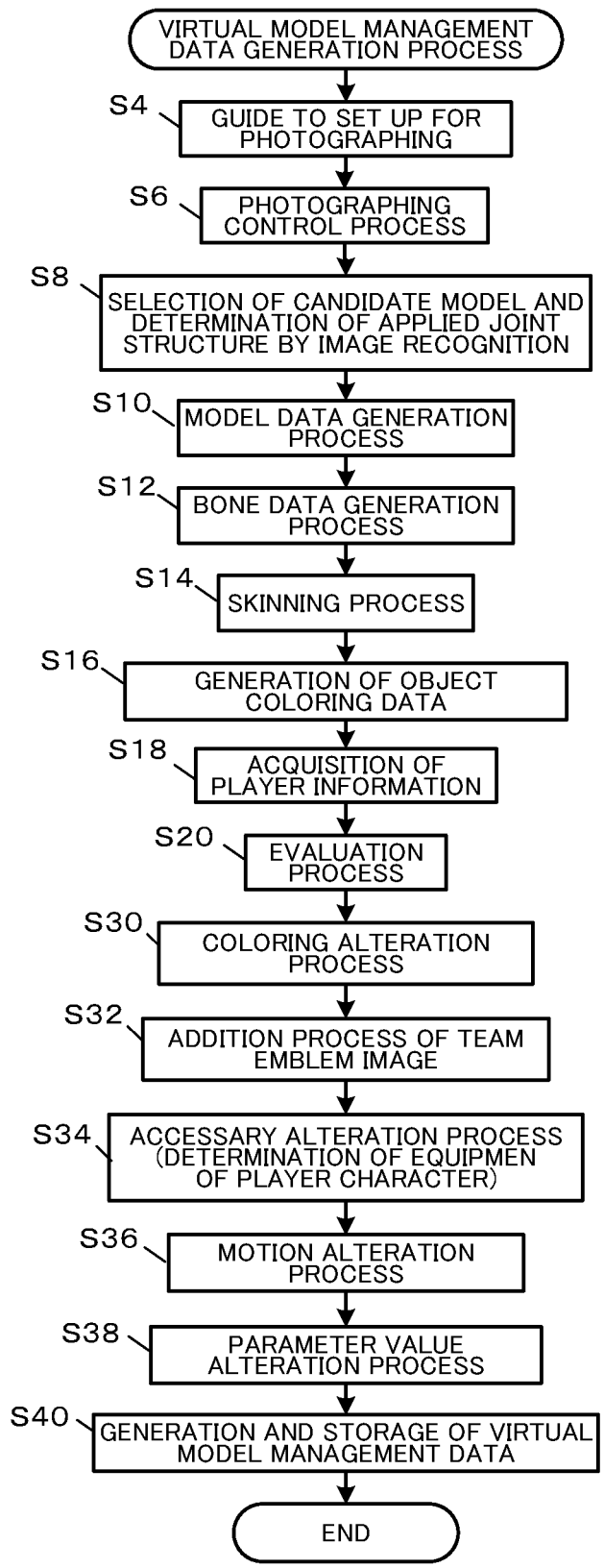
FIG. 23 is a flowchart of a flow of a virtual model management data generation process.

FIG. 23 is a flowchart illustrating a flow of a virtual model management data generation process executed in the server system 1100. This process is executed, for example, at timing before the player 2 performs the gameplay for the first time to prepare the virtual model of the player character. Assume that the player has already signed up as a user and has logged in.

The server system 1100 guides how to set up for photographing at first (step S4). For example, the server system 1100 displays, on the touch panel 1108 of the server system 1100 or the player terminal 1500, a guide as to where in the whole circumference photographing device 1130 and in what posture the assembly toy 3 should be placed.

Next, the server system 1100 executes a photographing control process (step S6). That is, the server system 1100 controls the operation of the whole circumference photographing device 1130 to perform the whole circumference photographing of the assembly toy 3, and stores the photographed data 661 in the virtual model generation control data 660 (see FIG. 20).

Next, the server system 1100 performs a process relating to the selection of the candidate model and the determination of the applied joint structure (step S8). That is, the server system 1100 performs the image recognition of the photographed data 661, and acquires the image recognition result 663 of the each part of the assembly toy 3. Then, the server system 1100 selects the candidate model included in the virtual model of the photographed assembly toy 3 (the object model). Selecting the candidate model becomes a determination of the applied joint structure for the selected candidate model by applying the bone data 526 (see FIG. 7).

Next, the server system 1100 executes a model data generation process to integrate the candidate model data 525 of the selected candidate models so as to generate the integrated virtual model data 611 (step S10). The server system 1100 also integrates the bone data 526 of the selected candidate model data to generate the integrated bone data 612 (step S12). Then, the server system 1100 generates the integrated skinning data 613 of the integrated virtual model data 611 and the bone data 526 (step S14; see FIG. 7).

Next, the server system 1100 collects information necessary for various types of alteration.

In particular, the server system 1100 generates the object coloring data 614 from the photographed data 661 (step S16; see FIGS. 9 and 11).

The server system 1100 also reads out and acquires the player information 602 (see FIG. 16) (step S18), and determines the evaluation point based on the photographed data 661 (step S20; see FIG. 10).

Next, the server system 1100 determines content of the various types of the alteration.

In particular, the server system 1100, as the coloring alteration, presents the object coloring and the available preset coloring to the user as the options, accepts the selection operation, and generates the applied coloring data 615 (step S30; see FIG. 9).

Furthermore, as for the user whose player information 602 satisfies a given addition permission condition (e.g., a user whose player level is at a criterion level), the server system 1100 accepts an addition operation for adding a team emblem image so as to change the applied coloring data 615 to add an image indicated by the team emblem image data 655 (step S32). Preferably, the addition operation includes an operation input indicating a position in the virtual model to add the team emblem image and a size of the team emblem image so as to determine an adding position and an adding size in accordance with the operation input.

Next, the server system 1100 alters the accessary as one of the various types of the alteration of the virtual model (step S34). In particular, the server system 1100 generates the available equipment list 666, and has the player select the equipment 5 to equip the player character with from the available equipment list 666 (see FIG. 15).

Next, the server system 1100 generates the motion-category-specific integrated motion data 616 to perform an alteration process of the motion of the virtual model (step S36), and generates the part-specific applied parameter value setting data 617 (see FIG. 14) to perform an alteration process of the parameter value (step S38). Then, the server system 1100 stores various types of data relating to the virtual model as the virtual model management data 610 (see FIG. 16) (step S40).

Figure 24:
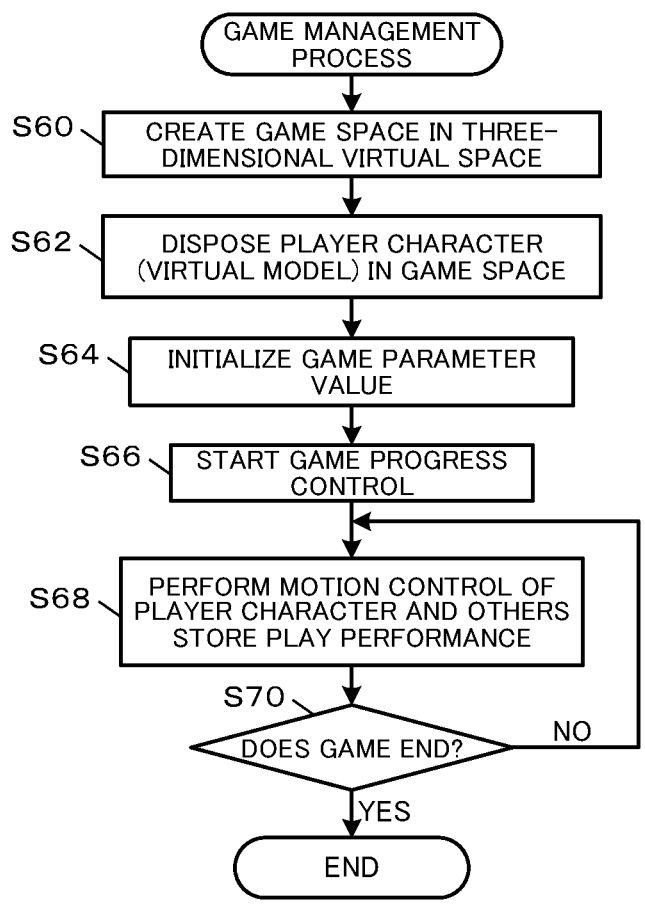
FIG. 24 is a flowchart of a flow of a game management process.

FIG. 24 is a flowchart illustrating a flow of a game management process executed by the server system 1100. This process relates to the gameplay executed with the user having the virtual model management data 610 as the player.

The server system 1100 disposes various types of objects constituting the game space in the three-dimensional virtual space at first (step S60), and disposes an object of the player character based on the virtual model management data 610 (see FIG. 16) of the player 2 in the game space (step S62). The object of the player character is based on the integrated virtual model data 611 applied with the integrated bone data 612 and the applied coloring data 615. The game screen is generated by adding various types of information displays to a game space image obtained by photographing a state of the game space by a virtual camera disposed in the three-dimensional virtual space.

Next, the server system 1100 initializes the game parameter value (step S64), and starts the game progress control (step S66). The server system 1100 refers to the part-specific applied parameter value setting data 617 (see FIG. 16) in initialization relating to the player character.

After starting the game progress control, the server system 1100 performs the motion control of various objects including the player character, and stores the play performance (step S68). The sever system 1100 applies the motion-category-specific integrated motion data 616 and the part-specific applied parameter value setting data 617 to the player character based on the operation input by the player 2 to perform the motion control.

When a given game termination condition is satisfied (YES at step S70), the server system 1100 terminates the game management process.

As described above, according to the present embodiment, the object prepared by applying a unique color arrangement by the user can be disposed in the virtual space for the computer graphics so as to have the object appear in the computer graphics. In particular, the whole circumference photographing can be performed for the object model of the assembly toy 3 of the character whose shape is known in the given work, and the 3D virtual model (the virtual model) can be generated from the photographed image so as to have the virtual model appear in the game as the player character.

Second Embodiment

Next, a second embodiment is described. The second embodiment is basically implemented similarly to the first embodiment. However, in comparison between the second embodiment and the first embodiment, each function of the game management is implemented in the server system 1100 in the first embodiment, whereas the game management is implemented in the player terminal 1500 in the second embodiment. The following mainly describes differences from the first embodiment. Components that are the same as the components in the first embodiment are denoted with the same referential numerals as the referential numerals in the first embodiment, and duplicate description is omitted.

Figure 25:
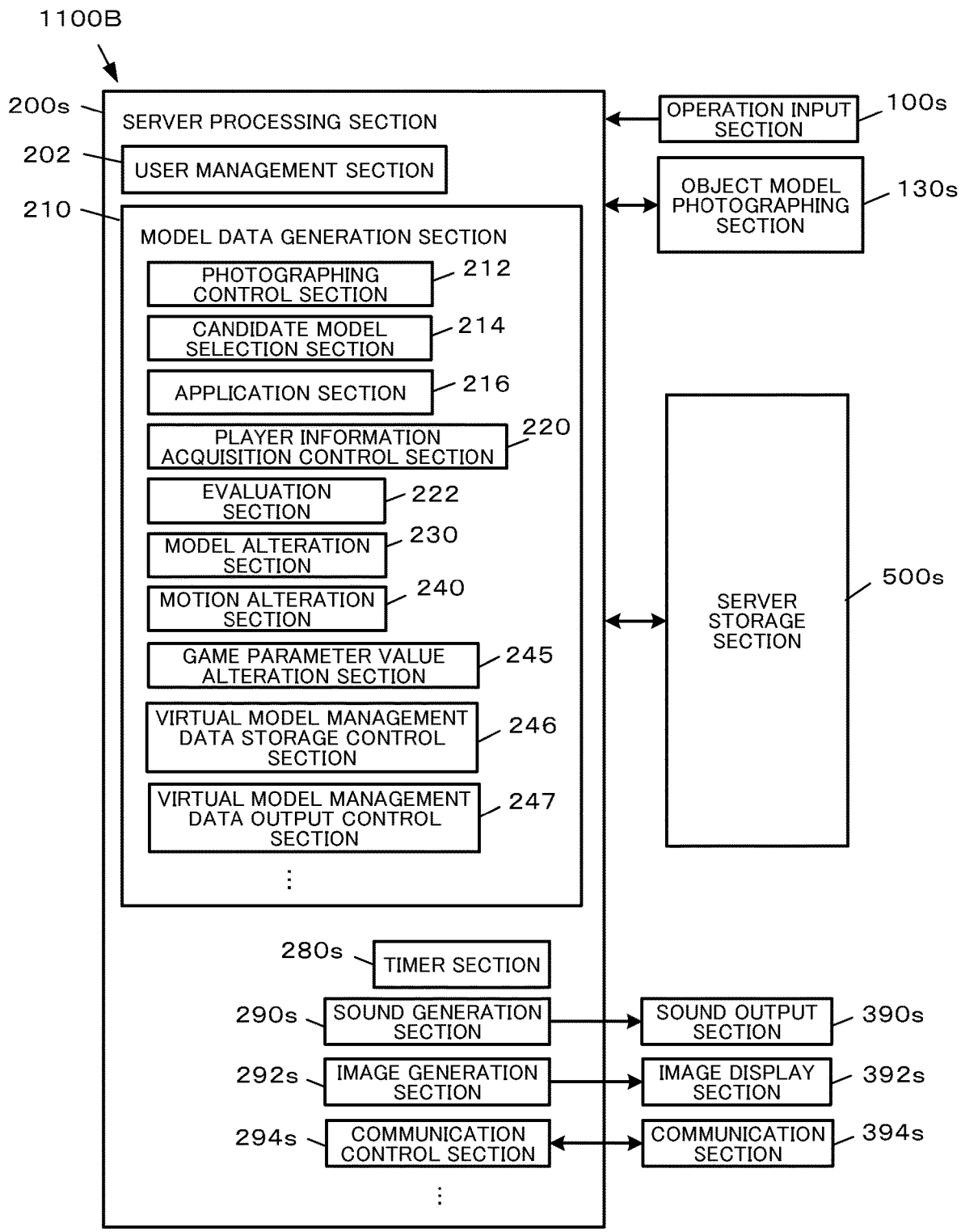
FIG. 25 is a diagram illustrating a functional configuration example of a server system according to a second embodiment.

FIG. 25 is a diagram illustrating a functional configuration example of a server system 1100B according to the present embodiment. Compared to the server system 1100 according to the first embodiment, the game management section 250 is omitted from the server system 1100B. Furthermore, the model data generation section 210 is added with a virtual model management data output control section 247.

The virtual model management data output control section 247 performs an output control, such as a data communication control, for providing the virtual model management data 610 to the player terminal 1500 according to the present embodiment.

Figure 26:
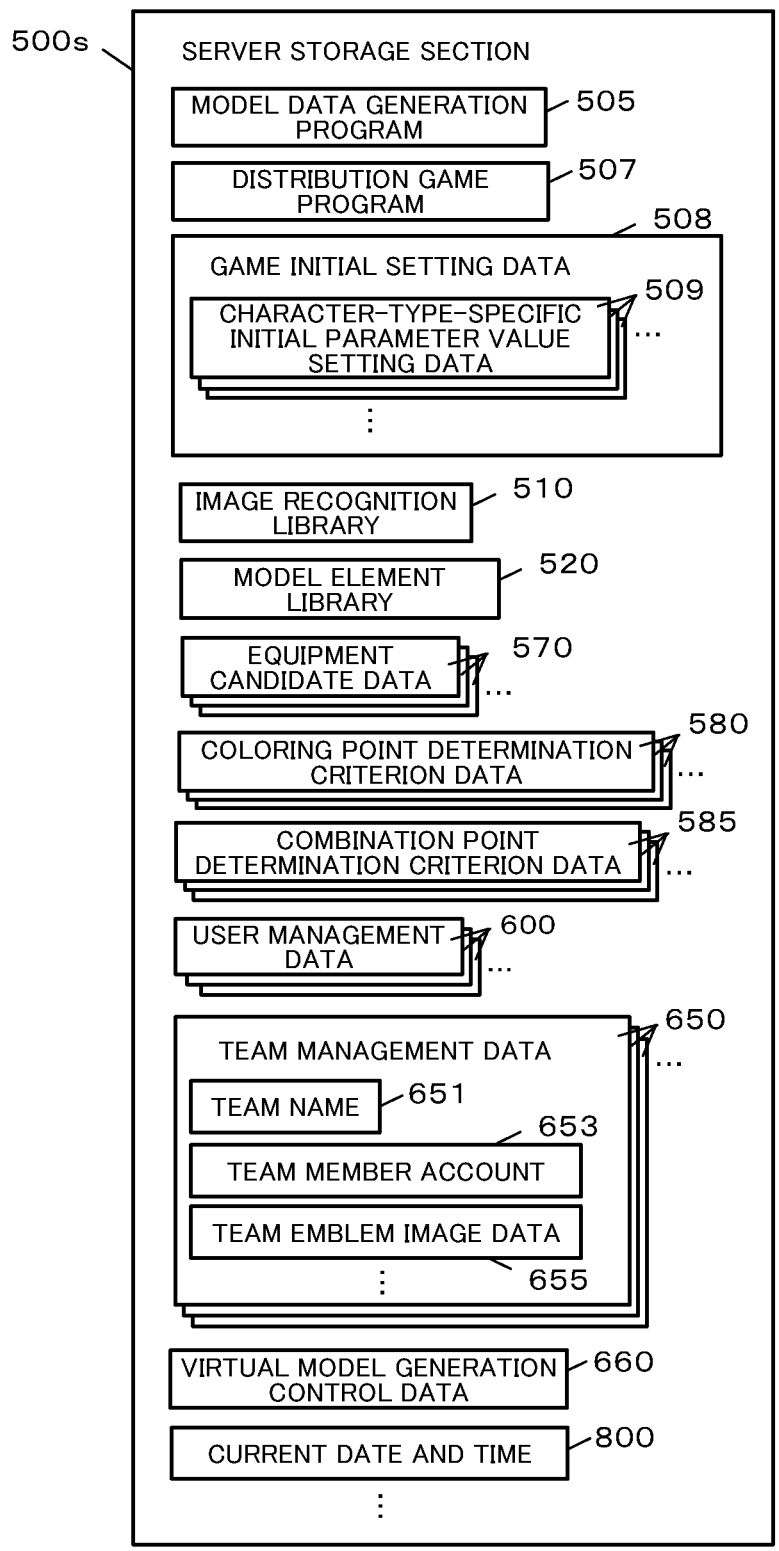
FIG. 26 is a diagram illustrating an example of programs and data stored in a server storage section according to the second embodiment.

FIG. 26 is a diagram illustrating an example of programs and data stored in the server storage section 500s according to the present embodiment. Compared to the first embodiment, the programs and data stored in the server storage section 500s of the server system 1100B include a model data generation program 505 that causes the server system 1100B to implement a function as the model data generation section 210 in place of the server program 501, and a distribution game program 507 in place of the distribution client program 503. The play data 700 is also omitted.

Figure 27:
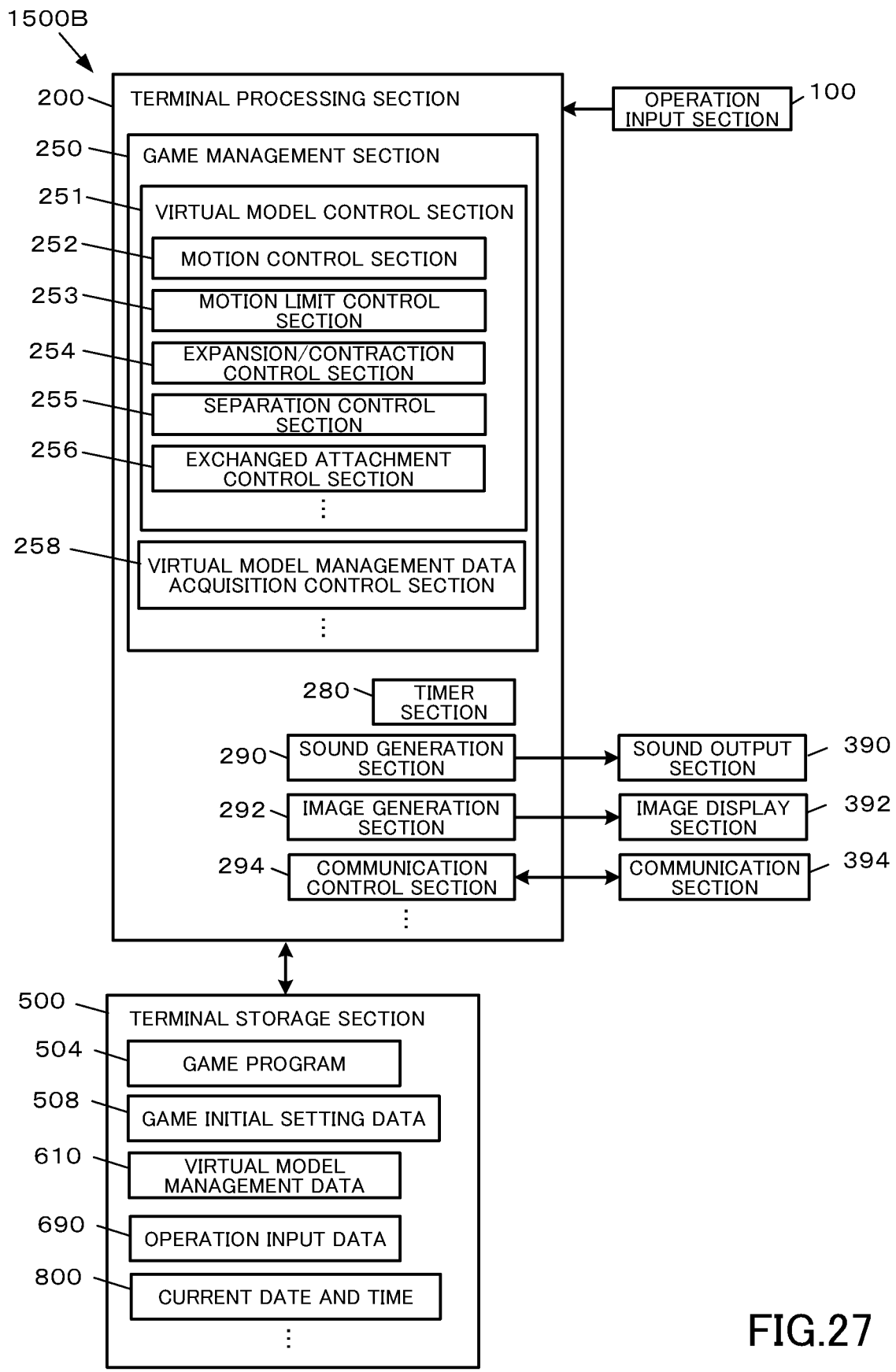
FIG. 27 is a functional block diagram illustrating a functional configuration example of a player terminal according to the second embodiment.

FIG. 27 is a diagram illustrating a functional configuration example of a player terminal 1500B according to the present embodiment. Compared to the player terminal 1500 according to the first embodiment, the player terminal 1500B includes the game management section 250 in place of the player terminal control section 260. The game management section 250 includes a virtual model management data acquisition control section 258.

The virtual model management data acquisition control section 258 performs a control for acquiring the virtual model management data 610 from the server system 1100B.

The terminal storage section 500 according to the present embodiment stores a game program 504 in place of the client program 502. The terminal storage section 500 also stores the virtual model management data 610 and the game initial setting data 508 acquired from the server system 1100B. The terminal storage section 500 also stores other information necessary for the game progress control acquired from the server system 1100B.

The server system 1100B generates and stores the virtual model management data 610.

The game management section 250 of the player terminal 1500B performs the game management process (see FIG. 24) as in the first embodiment. However, the game management section 250 additionally performs a step of confirming whether the player terminal 1500B stores the virtual model management data 610 before the step S60, and, if not, a step for sending an output request of the virtual model management data 610 of the player 2 to the server system 1100B and acquiring the virtual model management data 610 from the server system 1100B.

The present embodiment can provide the same advantageous effects as those of the first embodiment.

MODIFICATION EXAMPLES

The embodiments to which the present disclosure is applicable have been described so far. However, the modes to which the present disclosure is applicable are not limited to the foregoing embodiments, and the components can be added, omitted, or changed as appropriate.

Modification Example 1

For example, the server system 1100 and 1100B according to the embodiments described above may be implemented by a personal computer or the like. The game system 1000 may also be configured as an independent computer system such as a consumer game device instead of a plurality of computer systems including the server system 1100 and the player terminal 1500.

Modification Example 2

Furthermore, the embodiments described above may be added with a step that the player 2 paints on the coloring of the virtual model. For example, the server system determines whether the player information of the player has reached a given criterion. Upon positive determination, the server system displays a coloring demo based on the applied coloring data 615 along with a color pallet on the touch panel 1506 of the player terminal 1500. Then, upon acceptance of a touch operation imitating a paintbrush movement with a finger, the server system may change the applied coloring data 615 to add the color that the player 2 desires.

Modification Example 3

Furthermore, according to the embodiments described above, the image recognition of the photographed data 661 is performed to select an existing candidate model that matches the each part of the assembly toy 3, and then the virtual model management data 610 is generated. However, a function for generating the virtual model management data 610 from the photographed data 661 by photogrammetry can be added as appropriate.

In particular, when a shape of the object model is unknown beforehand (e.g., an object originally designed by the user such as a handmade stuffed animal), a matching candidate model can not be prepared beforehand. Accordingly, free model definition data 590 as illustrated in FIG.

28, for example, is prepared beforehand to be referred to when no matching candidate model exists.

The free model definition data 590 includes a whole shape category 591, whole shape category image recognition dictionary data 592, standard bone data 593, motion definition data 594, preset coloring definition data 530, and parameter value alteration definition data 560. Other types of data can be included as appropriate, of course.

The whole shape category 591 indicates a whole shape category that the object belongs to. The "whole shape category" includes a bipedal-walking-without-wing type, a bipedal-walking-with-wing type, a quadrupedal walking type, or a snake type, for example, and is prepared beforehand by presuming what the user would bring.

The whole shape category image recognition dictionary data 592 is dictionary data for determining that the shape of the object model matches a category indicated by the whole shape category 591 from the photographed data 661 by the image recognition.

Figure 28:
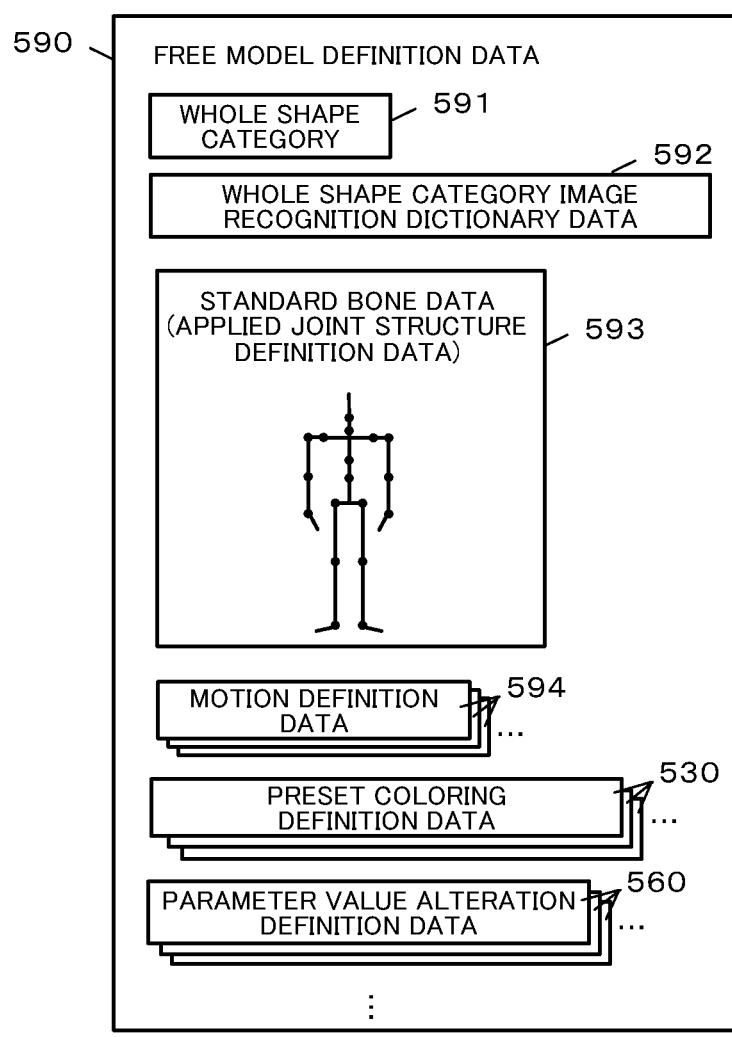
FIG. 28 is a diagram illustrating a data configuration example of free model definition data.

The standard bone data 593 indicates a relative arrangement between the bones and the joints assumed to be suitable for the shape indicated by the whole shape category 591. An example in FIG. 28 shows the standard bone data 593 when the whole shape category 591 is the "bipedal-walking-without-wing type", and thus the standard bone data 593 is like a human skeletal frame. When the whole shape category 591 is the "quadrupedal walking type", the standard bone data 593 is like a skeletal frame of a four-legged animal.

The motion definition data 594 defines the motion considered to be appropriate for the object in the shape indicated by the whole shape category 591. The motion definition data 594 corresponds to the part motion definition data 540 according to the first embodiment, but differs in that the motion definition data 594 defines the motion of the whole body instead of the motion of the part.

The preset coloring definition data 530 (see FIG. 9) and the parameter value alteration definition data 560 (see FIG. 14) can be set similarly to the preset coloring definition data and the parameter value alteration definition data according to the first embodiment by appropriately setting the use permission requirement 532 and the application requirement 561.

Figure 29:
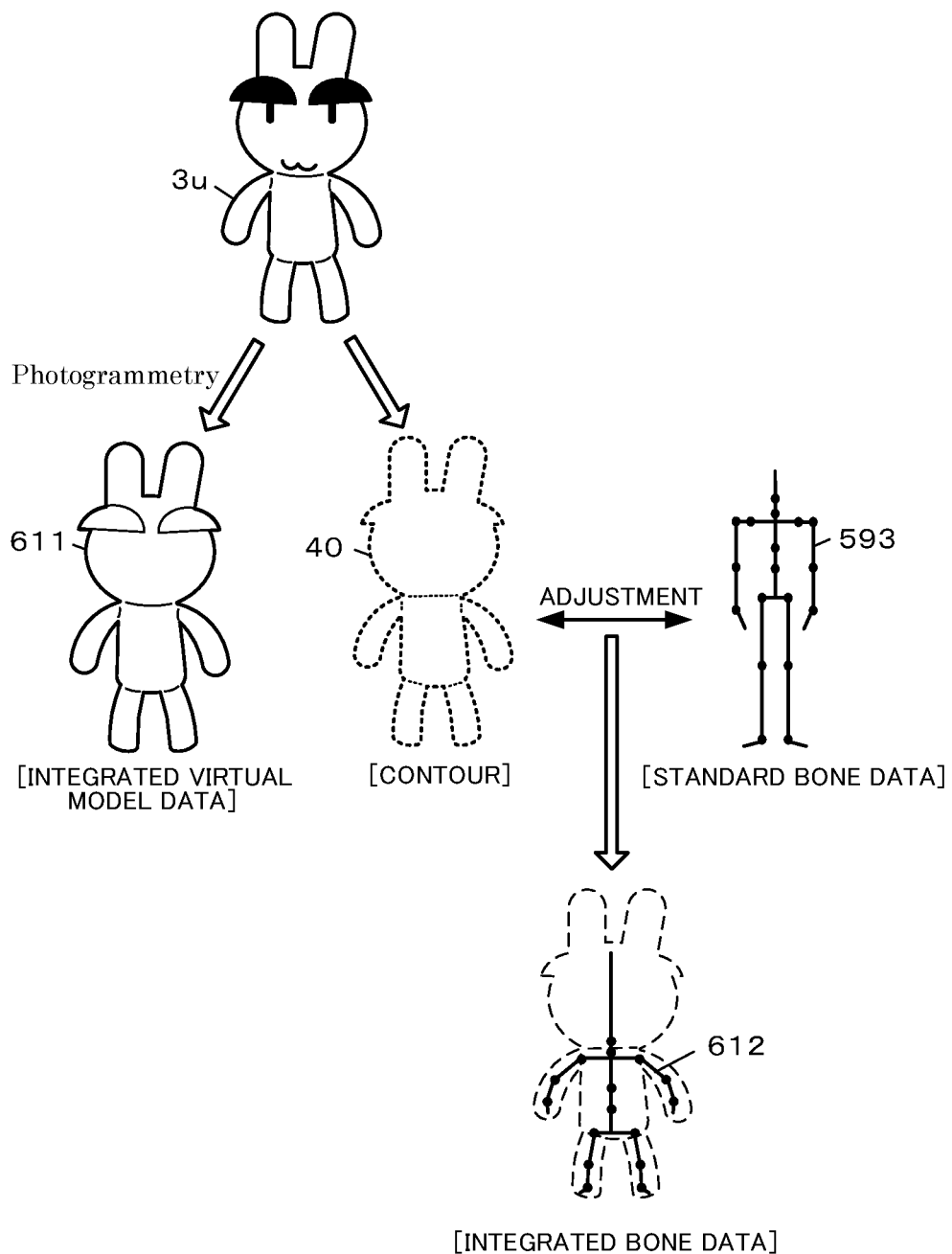
FIG. 29 is a diagram illustrating generation of a virtual model by photogrammetry.

As illustrated in FIG. 29, the server system 1100 analyzes the photographed data 661 and generates 3D virtual model data of an object model 3*u* by the photogrammetry to begin with. The 3D virtual model data is taken as the integrated virtual model data 611 (see FIG. 7). Reality is that the 3D virtual model data is merely data of a shape of an outer surface like a balloon doll.

Next, the server system 1100 extracts a contour 40 of the object model from the photographed data 661, and checks the contour 40 against the whole shape category image recognition dictionary data 592 to determine the whole shape category.

Then, the server system 1100 performs an adjustment process of a length of each bone and a position of each joint so that the standard bone data 593 prepared for the determined whole shape category fits into the contour 40 of the object model, and sets the adjusted bone data as the integrated bone data 612 (see FIG. 7).

In particular, the server system 1100 recognizes joint portions for connecting parts of the object model 3*u* from a relative positional relationship of the parts and unevenness of the contour 40, cuts each part off from the contour 40 (a cut-off example is shown in the contour 40 by thin broken lines in FIG. 29), matches a connecting position (a joint position) of the bone of each part of the standard bone data 593 with a cut-off position of the contour 40, and adjusts a length of the bone of the each part to match a length of the each part cut off from the contour, so as to generate the integrated bone data 612.

In other words, the server system 1100 controls movability of the joint relating to the applied joint structure of the virtual model and deformation of the joint by the motion control of the virtual model based on the motion data. The virtual model of the object model 3*u* has a structure like a glove (a plastic glove or a hand-knitted glove). With the glove that does not have specific positions designated for the joints, when a wearer (lengths of fingers, or distances between the joints are characteristic to each wearer) wears the glove and moves his/her hand, positions corresponding to the joints of the hand are determined depending on the wearer, and cloth or the like forming the glove deforms to follow the motion of the hand. The structure of the virtual model is similar to this.

The present modification example can be applied to both the first embodiment and the second embodiment.

Furthermore, when a generation element of the virtual model by the photogrammetry is added, not only the entire virtual model, as in the present modification example, but also part of the virtual model may be generated by the photogrammetry. For example, as for the assembly toy 3 according to the embodiments described above, the photogrammetry may be used only for a limited portion (e.g., an ornament on a head) to which the user can easily add an external feature. The 3D virtual model of this portion may be generated by the photogrammetry from the photographed data 661 of the assembly toy 3 so as to be added to the selected candidate model.

Modification Example 4

Furthermore, according to the embodiments described above, the virtual model generated from the photographed data 661 of the object model is described to be used in a video game. However, the usage may be other than the game. For example, the virtual model may be used for a virtual character, an environment object, a digital signage or the like in a landscape simulation related to city planning or architectural planning, or in a virtual reality (VR), for example.

Modification Example 5

Furthermore, according to the embodiments described above, a process for determining the type of the object model from the photographed data 661 is implemented by automatic processing using the image recognition. However, options (e.g., a list of character names in the original work) may be presented to the player 2 so as to have the player 2 make a selection to determine the type of the object model.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A computer system comprising:
at least one processor or circuit programmed to perform:
generating model data of a virtual model imitating an object model based on photographed data obtained by photographing the object model including a joint structure;
applying an applied joint structure to the virtual model; and
storing in a predetermined storage section or externally outputting virtual model management data including the model data and data of the applied joint structure as data for disposing the virtual model based on the model data in a virtual space and causing a joint of the virtual model to function in accordance with the applied joint structure.

2. The computer system as defined in claim 1, wherein
the photographed data is data obtained by photographing a whole circumference of the object model from multiple directions, and
generating the model data includes generating the model data for forming the virtual model in three dimensions based on the photographed data.

3. The computer system as defined in claim 1, wherein
the at least one processor or circuit is further programmed to perform
selecting a candidate model that matches the photographed object model from a plurality of candidate models, and
applying includes selecting an applied joint structure candidate corresponding to the candidate model, and applying the selected applied joint structure candidate as the applied joint structure.

4. The computer system as defined in claim 3, wherein selecting the candidate model includes selecting the candidate model that matches the photographed object model from the plurality of candidate models by performing an image recognition process based on the photographed data.

5. The computer system as defined in claim 1, wherein applying includes applying the applied joint structure based on a joint portion of the virtual model.

6. The computer system as defined in claim 1, wherein
the at least one processor or circuit is further programmed to perform
acquiring player information of a player relating to a given game,
the virtual space is a game space of the game, and
generating the model data includes generating the model data of the virtual model altered based on the player information.

7. The computer system as defined in claim 6, wherein generating the model data includes presenting options for alteration of the virtual model based on the player information to the player, and generating the model data of the virtual model altered based on a selection operation by the player.

8. The computer system as defined in claim 6, wherein generating the model data includes altering at least coloring of the virtual model.

9. The computer system as defined in claim 6, wherein generating the model data includes altering at least a parameter value serving as a basis of a motion control of the virtual model in the game space.

10. The computer system as defined in claim 6, wherein generating the model data includes altering at least a game parameter value relating to the game of the virtual model.

11. The computer system as defined in claim 6, wherein
the at least one processor or circuit is further programmed to perform
evaluating the object model based on the photographed data,
setting a game parameter value relating to the game of the virtual model based on an evaluation result,
the object model is an assembly toy imitating a character in a given work, and
the virtual model management data includes the game parameter value.

12. The computer system as defined in claim 1, wherein the at least one processor or circuit is further programmed to perform
disposing the virtual model in the virtual space based on the virtual model management data, and
causing the joint relating to the applied joint structure to function based on given motion data to control the virtual model.

13. The computer system as defined in claim 12, wherein controlling the virtual model includes controlling movability of the joint relating to the applied joint structure and deformation of the joint by a motion control of the virtual model based on the motion data.

14. The computer system as defined in claim 12, wherein
the at least one processor or circuit is further programmed to perform
setting a motion limit of the joint relating to the applied joint structure, and
controlling the virtual model includes performing a motion control of the joint based on the motion data within a range of the motion limit.

15. The computer system as defined in claim 12, wherein the at least one processor or circuit is further programmed to perform
causing the virtual model to partly expand and contract.

16. The computer system as defined in claim 12, wherein the at least one processor or circuit is further programmed to perform
causing a separable part included in the virtual model to separate from the virtual model.

17. The computer system as defined in claim 16, wherein the at least one processor or circuit is further programmed to perform
causing a given different part exchangeable with the separable part to attach to the virtual model in place of the separable part separated from the virtual model.

18. A method for controlling generation of a virtual model, the method, performed by a computer system, comprising:
generating model data of the virtual model imitating an object model based on photographed data obtained by photographing the object model including a joint structure;
applying an applied joint structure to the virtual model; and
storing in a predetermined storage section or externally outputting virtual model management data including the model data and data of the applied joint structure as data for disposing the virtual model based on the model data in a virtual space and causing a joint of the virtual model to function in accordance with the applied joint structure.

* * * * *